United States Patent
Podhajny et al.

(10) Patent No.: US 11,857,022 B2
(45) Date of Patent: *Jan. 2, 2024

(54) ARTICLE OF FOOTWEAR INCORPORATING A KNITTED COMPONENT WITH TENSILE STRAND

(71) Applicant: NIKE, Inc., Beaverton, OR (US)

(72) Inventors: Daniel A. Podhajny, Beaverton, OR (US); Chung-Ming Chang, Yun-Lin (TW); Ya-Fang Chen, Chang-Hua (TW); Pei-Ju Su, Miao-Li (TW)

(73) Assignee: NIKE, Inc., Beaverton, OR (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/388,936

(22) Filed: Jul. 29, 2021

(65) Prior Publication Data

US 2021/0352994 A1    Nov. 18, 2021

Related U.S. Application Data

(62) Division of application No. 15/374,629, filed on Dec. 9, 2016, now Pat. No. 11,116,274, which is a division
(Continued)

(51) Int. Cl.
*A43B 1/04* (2022.01)
*A43B 23/02* (2006.01)
(Continued)

(52) U.S. Cl.
CPC .............. *A43B 1/04* (2013.01); *A43B 1/0063* (2013.01); *A43B 23/021* (2013.01);
(Continued)

(58) Field of Classification Search
CPC ......... A43B 1/04; A43B 1/00; A43B 23/0235; A43B 23/04; A43B 23/0245;
(Continued)

(56) References Cited

U.S. PATENT DOCUMENTS 2,147,197 A    2/1939  Glidden
2,314,098 A    3/1943  Raymond
(Continued)

FOREIGN PATENT DOCUMENTS

CN          1172621 A     2/1998
CN       101562999 A    10/2009
(Continued)

OTHER PUBLICATIONS

Declaration of Dr. Edward C. Frederick from the US Patent and Trademark Office Inter Partes Review of U.S. Pat. No. 7,347,011, 178 pages.
(Continued)

*Primary Examiner* — Katharine G Kane
(74) *Attorney, Agent, or Firm* — SHOOK, HARDY & BACON L.L.P.

(57) ABSTRACT

An upper for an article of footwear is configured to be connected to a sole structure and is configured to receive a foot. The upper includes a knitted component having a strobel portion that is configured to be disposed underneath the foot. The strobel portion defines an interior surface and an exterior surface of the knitted component. The strobel portion defines a strobel passage between the interior surface and the exterior surface. Also, the upper includes a tensile strand that extends through the strobel passage.

10 Claims, 20 Drawing Sheets

Related U.S. Application Data of application No. 13/783,782, filed on Mar. 4, 2013, now Pat. No. 9,545,128.

(51) Int. Cl.

| | | |
|---|---|---|
| *A43C 1/04* | (2006.01) | |
| *D04B 1/12* | (2006.01) | |
| *A43B 1/00* | (2006.01) | |
| *A43B 23/04* | (2006.01) | |

(52) U.S. Cl.
CPC ........ *A43B 23/025* (2013.01); *A43B 23/0215* (2013.01); *A43B 23/0235* (2013.01); *A43B 23/0245* (2013.01); *A43B 23/0265* (2013.01); *A43B 23/0275* (2013.01); *A43B 23/042* (2013.01); *A43C 1/04* (2013.01); *D04B 1/123* (2013.01); *D10B 2403/0213* (2013.01); *D10B 2403/02411* (2013.01); *D10B 2403/032* (2013.01); *D10B 2501/043* (2013.01)

(58) Field of Classification Search
CPC ..... A43B 23/042; A43B 23/0275; A43C 1/04; A43C 1/003; A43C 11/14; D10B 2501/043; D10B 2501/0213; D10B 2501/02411; D10B 2501/032; D04B 1/123

See application file for complete search history.

(56) References Cited

U.S. PATENT DOCUMENTS

| | | |
|---|---|---|
| 2,343,390 A | 3/1944 | Ushakoff |
| 2,440,393 A | 4/1948 | Clark |
| 2,495,984 A | 1/1950 | Roy |
| 2,569,764 A | 10/1951 | Jonas |
| 2,608,078 A | 8/1952 | Anderson |
| 2,641,004 A | 6/1953 | Whiting et al. |
| 3,583,081 A | 6/1971 | Hayashi |
| 3,672,187 A | 6/1972 | Simpson |
| 4,003,224 A | 1/1977 | Odham |
| 4,447,967 A | 5/1984 | Zaino |
| 4,592,154 A | 6/1986 | Oatman |
| 4,654,985 A | 4/1987 | Chalmers |
| 4,750,339 A | 6/1988 | Simpson et al. |
| 4,756,098 A | 7/1988 | Boggia |
| 4,785,558 A | 11/1988 | Shiomura |
| 4,811,503 A | 3/1989 | Iwama |
| 4,813,158 A | 3/1989 | Brown |
| 5,291,671 A | 3/1994 | Caberlotto et al. |
| 5,345,638 A | 9/1994 | Nishida |
| 5,371,957 A | 12/1994 | Gaudio |
| 5,678,329 A | 10/1997 | Griffin et al. |
| 5,692,319 A | 12/1997 | Parker et al. |
| 5,755,044 A | 5/1998 | Veylupek |
| 5,896,758 A * | 4/1999 | Rock ................ A43B 23/0205 66/194 |
| 6,029,376 A | 2/2000 | Cass |
| 6,032,387 A | 3/2000 | Johnson |
| 6,052,921 A | 4/2000 | Oreck |
| 6,074,965 A | 6/2000 | Bodenschatz et al. |
| 6,286,233 B1 | 9/2001 | Gaither |
| 6,333,105 B1 | 12/2001 | Tanaka et al. |
| 6,378,230 B1 | 4/2002 | Rotem et al. |
| 6,598,322 B2 | 7/2003 | Jacques et al. |
| 6,772,541 B1 | 8/2004 | Ritter et al. |
| 7,134,224 B2 | 11/2006 | Elkington et al. |
| D553,842 S | 10/2007 | Paz |
| 7,343,701 B2 | 3/2008 | Pare et al. |
| 7,562,470 B2 | 7/2009 | Keen |
| 7,568,298 B2 | 8/2009 | Kerns |
| 7,631,440 B2 | 12/2009 | Keen et al. |
| 7,793,435 B1 | 9/2010 | Ruth |
| 8,006,410 B2 | 8/2011 | Romboli et al. |
| 8,074,379 B2 | 12/2011 | Robinson et al. |
| 8,151,490 B2 | 4/2012 | Sokolowski |
| 8,230,618 B2 | 7/2012 | Bruce et al. |
| 9,545,128 B2 | 1/2017 | Podhajny et al. |
| 2002/0148258 A1 | 10/2002 | Cole et al. |
| 2004/0181972 A1 | 9/2004 | Csorba |
| 2005/0284000 A1 | 12/2005 | Kerns |
| 2006/0048413 A1 | 3/2006 | Sokolowski et al. |
| 2007/0011914 A1 | 1/2007 | Keen et al. |
| 2008/0110049 A1 | 5/2008 | Sokolowski et al. |
| 2009/0126231 A1 | 5/2009 | Malmivaara |
| 2010/0077634 A1 | 4/2010 | Bell |
| 2010/0154256 A1 | 6/2010 | Dua |
| 2011/0197475 A1 | 8/2011 | Weidl et al. |
| 2011/0258876 A1 | 10/2011 | Baker et al. |
| 2012/0023686 A1 | 2/2012 | Huffa et al. |
| 2012/0118453 A1 | 5/2012 | Pax et al. |
| 2012/0131818 A1 | 5/2012 | Nishiwaki et al. |
| 2012/0233882 A1 | 9/2012 | Huffa et al. |
| 2012/0240428 A1 | 9/2012 | Knoll |
| 2012/0255201 A1 | 10/2012 | Little |
| 2012/0260526 A1 | 10/2012 | Smith et al. |
| 2012/0318026 A1 | 12/2012 | Dua et al. |
| 2014/0196314 A1* | 7/2014 | Beye ................ A43B 23/0245 428/166 |
| 2014/0196315 A1* | 7/2014 | Beye ................ D04B 21/20 428/119 |
| 2014/0245632 A1 | 9/2014 | Podhajny et al. |
| 2017/0119083 A1 | 5/2017 | Podhajny et al. |

FOREIGN PATENT DOCUMENTS

| | | |
|---|---|---|
| CN | 101632502 A | 1/2010 |
| CN | 102271548 A | 12/2011 |
| CN | 202247139 U | 5/2012 |
| CN | 102595951 A | 7/2012 |
| CN | 202335387 U | 7/2012 |
| DE | 1084173 B | 6/1960 |
| DE | 19738433 A1 | 4/1998 |
| DE | 19728848 A1 | 1/1999 |
| EP | 0448714 A1 | 10/1991 |
| EP | 0728860 A1 | 8/1996 |
| EP | 0758693 A1 | 2/1997 |
| EP | 1233091 A1 | 8/2002 |
| FR | 2171172 A1 | 9/1973 |
| FR | 2697727 A3 | 5/1994 |
| GB | 538865 A | 8/1941 |
| GB | 1603487 A | 11/1981 |
| JP | H06113905 A | 4/1994 |
| JP | H08109553 A | 4/1996 |
| JP | H0965908 A | 3/1997 |
| JP | H11302943 A | 11/1999 |
| JP | 2007190351 A | 8/2007 |
| JP | 2010508968 A | 3/2010 |
| JP | 2012512698 A | 6/2012 |
| NL | 7304678 A | 10/1974 |
| WO | 9003744 A1 | 4/1990 |
| WO | 0032861 A1 | 6/2000 |
| WO | 0231247 A1 | 4/2002 |
| WO | 2008063385 A1 | 5/2008 |
| WO | 2010080182 A1 | 7/2010 |

OTHER PUBLICATIONS

Letter from Bruce Huffa, Dec. 23, 2013, 71 pages.
Eberle et al., "Clothing Technology", Sixth German Edition and Third English Edition; ISBN 3-8085-6223-4, Petitioner adidas AG—Exhibit 1013, 2002, 3 pages.
Spencer, DavidJ. , "Knitting Technology, A comprehensive handbook and practical guide", Third Edition; Woodhead Publishing Limited, Abington Hall, Abington Cambridge, CB1 6AH, England, ISBN 1855733331, Exhibit 1012 in IPR2013-00067, Nov. 28, 2012, 413 pages.

* cited by examiner

ARTICLE OF FOOTWEAR INCORPORATING A KNITTED COMPONENT WITH TENSILE STRAND

RELATED APPLICATIONS

The present application is a divisional of U.S. patent application Ser. No. 15/374,629, filed Dec. 9, 2016, which is a divisional of U.S. patent application Ser. No. 13/783,782, filed Mar. 4, 2013, the entireties of which are hereby incorporated by reference.

BACKGROUND

1. Field of the Invention

The present disclosure relates to an article of footwear and, more particularly, relates to an article of footwear incorporating a knitted component with an integrally knit contoured portion.

2. Description of the Related Art

Conventional articles of footwear generally include two primary elements, an upper and a sole structure. The upper is secured to the sole structure and forms a void on the interior of the footwear for comfortably and securely receiving a foot. The sole structure is secured to a lower area of the upper, thereby being positioned between the upper and the ground. In athletic footwear, for example, the sole structure may include a midsole and an outsole. The midsole often includes a polymer foam material that attenuates ground reaction forces to lessen stresses upon the foot and leg during walking, running, and other ambulatory activities. Additionally, the midsole may include fluid-filled chambers, plates, moderators, or other elements that further attenuate forces, enhance stability, or influence the motions of the foot. The outsole is secured to a lower surface of the midsole and provides a ground-engaging portion of the sole structure formed from a durable and wear-resistant material, such as rubber. The sole structure may also include a sockliner positioned within the void and proximal a lower surface of the foot to enhance footwear comfort.

The upper generally extends over the instep and toe areas of the foot, along the medial and lateral sides of the foot and around the heel area of the foot. In some articles of footwear, such as basketball footwear and boots, the upper may extend upward and around the ankle to provide support or protection for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance adjustability of the footwear, and the upper may incorporate a heel counter to limit movement of the heel.

A variety of material elements (e.g., textiles, polymer foam, polymer sheets, leather, synthetic leather) are conventionally utilized in manufacturing the upper. In athletic footwear, for example, the upper may have multiple layers that each include a variety of joined material elements. As examples, the material elements may be selected to impart stretch-resistance, wear-resistance, flexibility, air-permeability, compressibility, comfort, and moisture-wicking to different areas of the upper. In order to impart the different properties to different areas of the upper, material elements are often cut to desired shapes and then joined together, usually with stitching or adhesive bonding. Moreover, the material elements are often joined in a layered configuration to impart multiple properties to the same areas. As the number and type of material elements incorporated into the upper increases, the time and expense associated with transporting, stocking, cutting, and joining the material elements may also increase. Waste material from cutting and stitching processes also accumulates to a greater degree as the number and type of material elements incorporated into the upper increases. Moreover, uppers with a greater number of material elements may be more difficult to recycle than uppers formed from fewer types and numbers of material elements. By decreasing the number of material elements utilized in the upper, therefore, waste may be decreased while increasing the manufacturing efficiency and recyclability of the upper.

SUMMARY

This section provides a general summary of the disclosure, and is not a comprehensive disclosure of its full scope or all of its features.

An upper for an article of footwear that is configured to be connected to a sole structure and that is configured to receive a foot is disclosed. The upper includes a knitted component having a strobel portion that is configured to be disposed underneath the foot. The strobel portion defines an interior surface and an exterior surface of the knitted component. The strobel portion defines a strobel passage between the interior surface and the exterior surface. Also, the upper includes a tensile strand that extends through the strobel passage.

Additionally, a method of manufacturing an upper that is configured to be connected to a sole structure and that is configured to be worn on a foot is disclosed. The method includes knitting a knitted component having a strobel portion that is configured to be disposed underneath the foot. The strobel portion defines an interior surface and an exterior surface of the knitted component. The strobel portion defines a strobel passage between the interior surface and the exterior surface. Additionally, the method includes extending a tensile strand through the strobel passage.

Moreover, an article of footwear configured to be worn on a foot is disclosed. The article of footwear includes a sole structure and an upper that is operably coupled to the sole structure. The upper includes a knitted component having a strobel portion that is configured to be disposed underneath the foot and a side portion that configured to at least partially cover a side area of the foot. The strobel portion defines an interior surface and an exterior surface of the knitted component. The strobel portion defines a strobel passage between the interior surface and the exterior surface. Moreover, the article of footwear includes a strand that extends through the strobel passage.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIGS. 10 and 11 are bottom plan views of the knitted component, wherein FIG. 10 shows the closure member in the unsecured position and FIG. 11 shows the closure member in the secured position;

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

General Discussion of Article of Footwear

Figure 1:
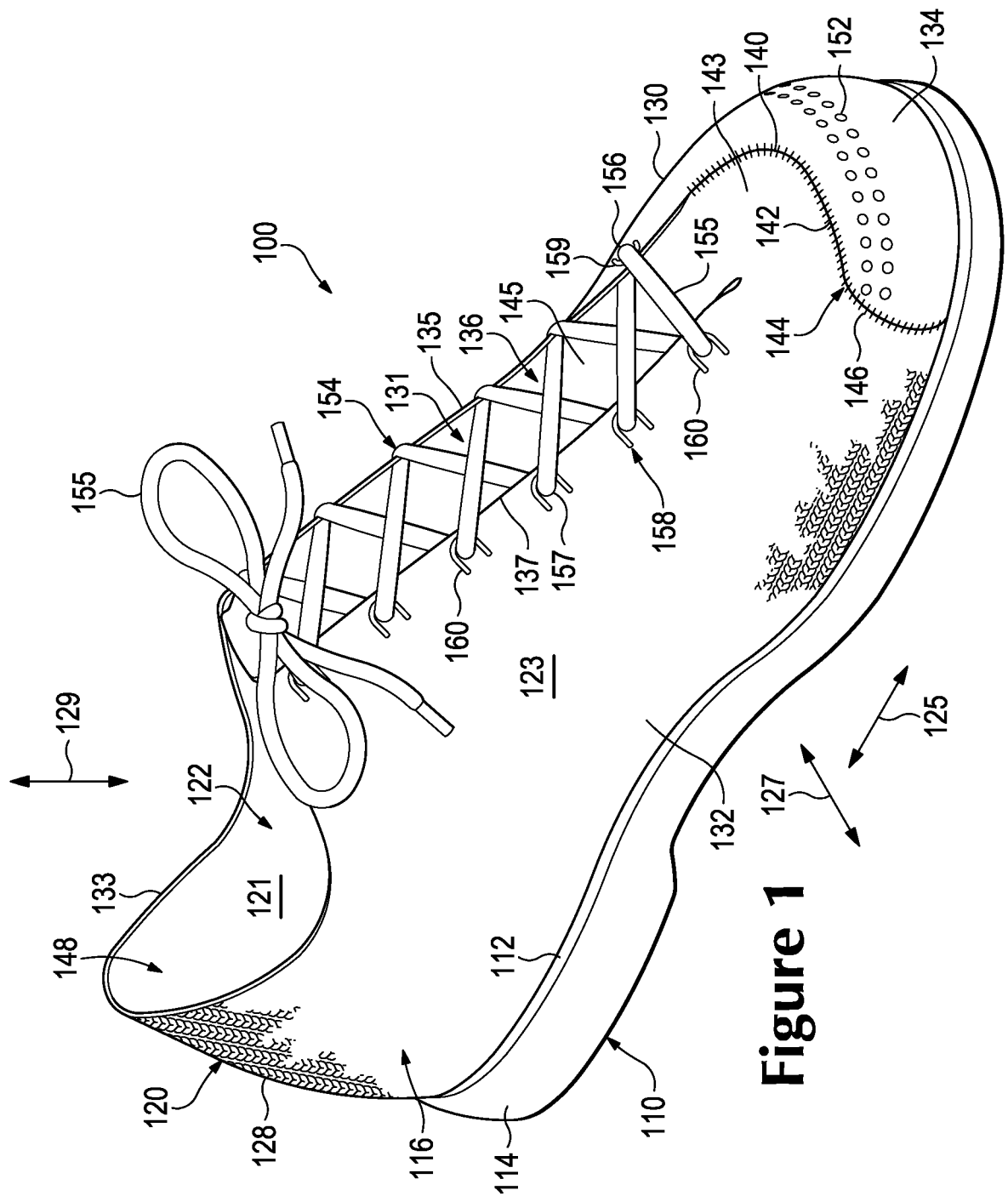
FIG. 1 is a perspective view of an article of footwear according to exemplary embodiments of the present disclosure.
Figure 2:
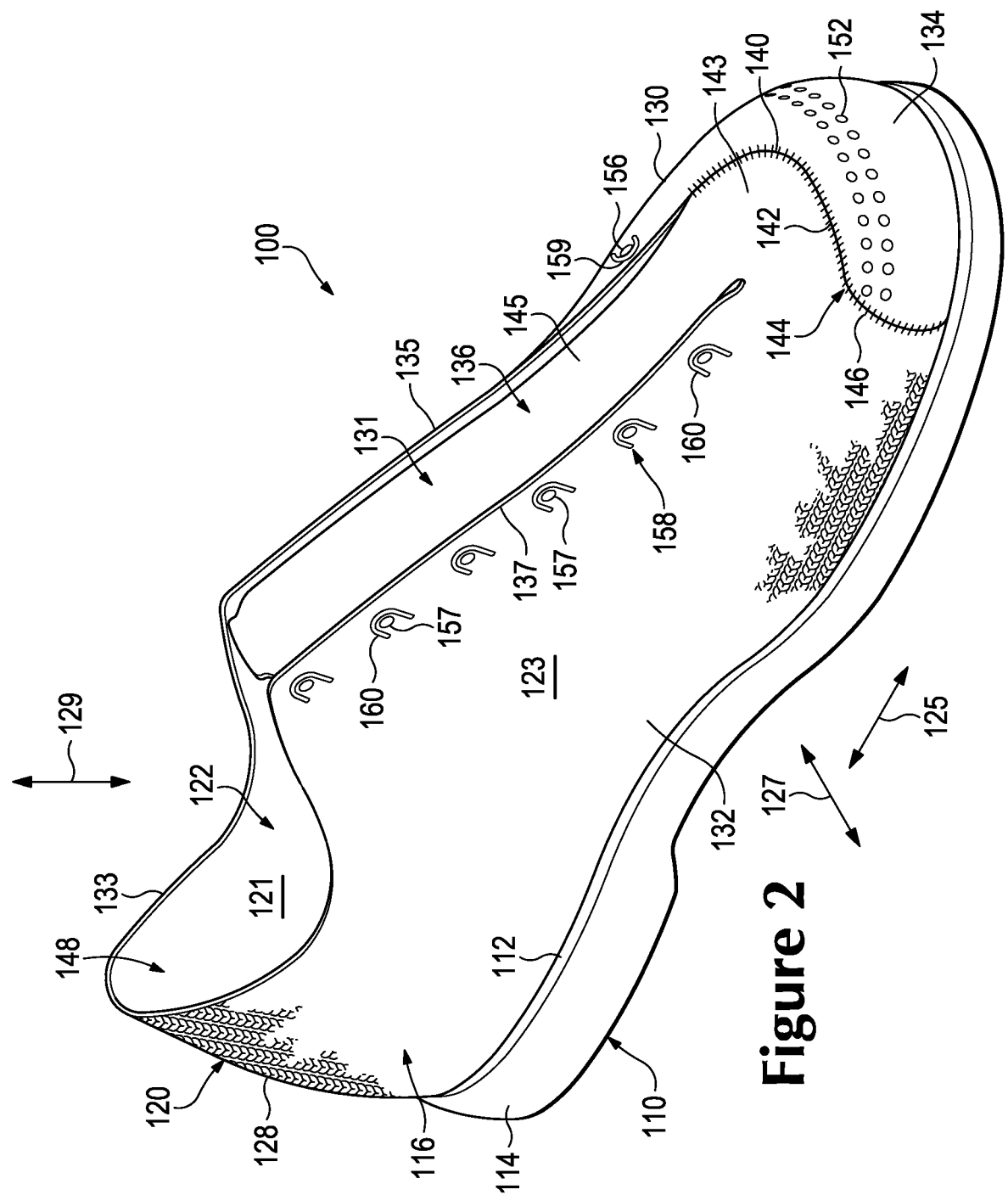
FIG. 2 is a perspective view of the article of footwear of FIG. 1 with a closure member removed.
Figure 3:
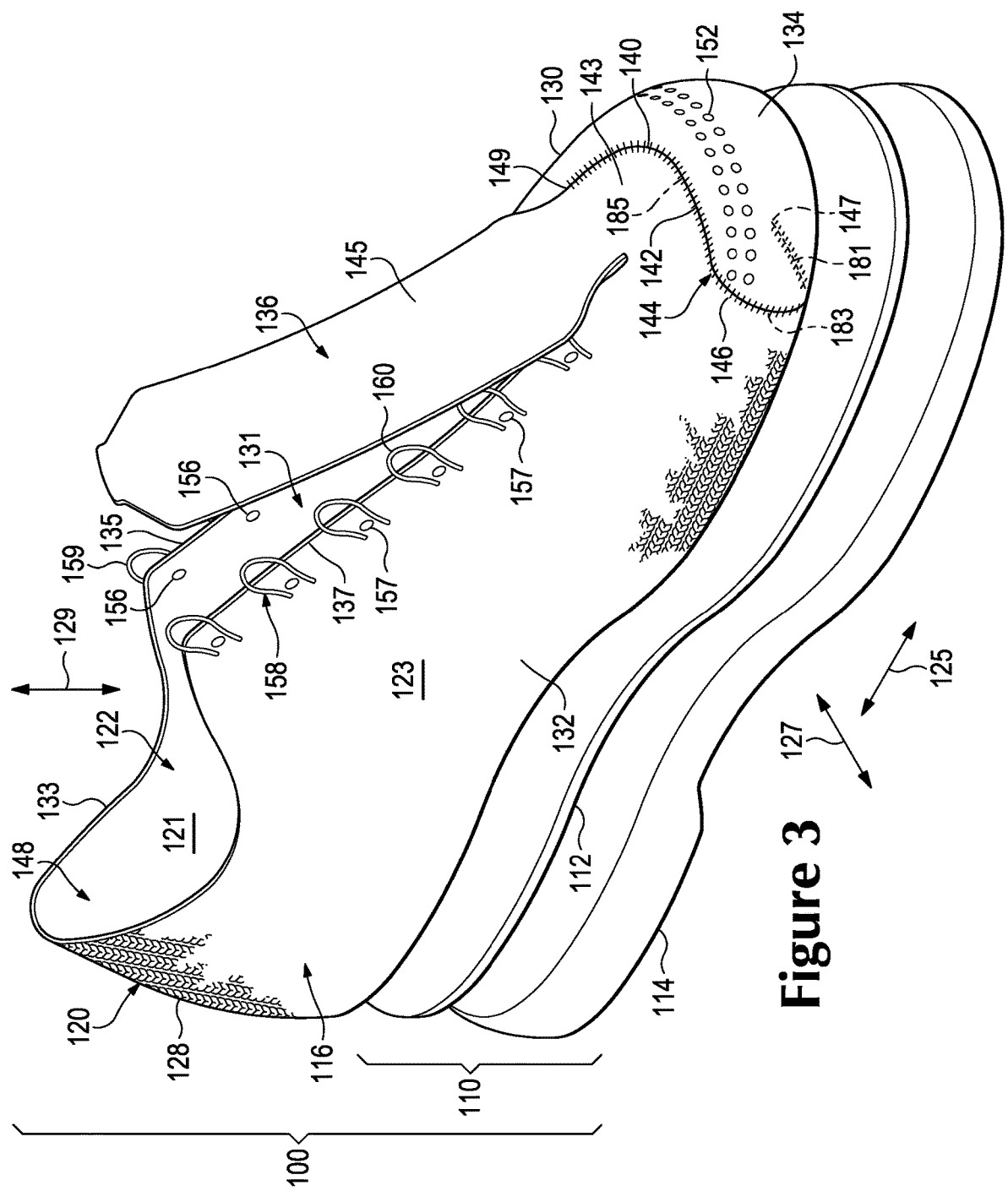
FIG. 3 is an exploded perspective view of the article of footwear of FIG. 2.

Referring initially to FIGS. 1-3, an article of footwear 100 is illustrated according to exemplary embodiments. The footwear 100 can generally include a sole structure 110 and an upper 120.

Sole structure 110 is secured to upper 120 and extends between the foot and the ground when footwear 100 is worn. The sole structure 110 can include a midsole 112 and an outsole 114 that are layered on each other. The midsole 112 can include a resiliently compressible material, fluid-filled bladders, and the like. As such, the midsole 112 can cushion the wearer's foot and attenuate impact and other forces when running, jumping, and the like. The outsole 114 can be secured to the midsole 112 and can include a wear resistant material, such as rubber and the like. The outsole 114 can also include tread and other traction-enhancing features.

Moreover, the upper 120 can define a void 122 that receives a foot of the wearer. Stated differently, the upper 120 can define an interior surface 121 that defines the void 122, and the upper 120 can define an exterior surface 123 that faces in a direction opposite the interior surface 121. When the wearer's foot is received within the void 122, the upper 120 can at least partially enclose and encapsulate the wearer's foot.

Many conventional footwear uppers are formed from multiple material elements (e.g., textiles, polymer foam, polymer sheets, leather, synthetic leather) that are joined through stitching or bonding, for example. In contrast, at least a portion of upper 120 is formed from a knitted component 116 having a unitary knit construction. As such, knitted component 116 defines at least a portion of the void within upper 120. Also, the knitted component 116 can define at least a portion of the exterior surface 123 and/or the interior surface 121 of the upper 120.

In some embodiments, the knitted component 116 can define a majority of the upper 120. Decreasing the number of material elements used in forming the upper 120 may decrease waste, while also increasing the manufacturing efficiency and recyclability of the upper 120. As discussed in greater detail below, the knitted component 116 of the upper 120 of the present disclosure can decrease waste and increase manufacturing efficiency and recyclability. Additionally, the knitted component 116 of the upper 120 can incorporate smaller numbers of seams or other discontinuities, thereby enhancing the overall comfort of footwear 100.

The knitted component 116 may also have common properties when formed from the same strand, yarn (or type of yarn) or with similar knit structures. For example, using the same strand in various portions of the knitted component 116 can impart similar durability, strength, stretch, wear-resistance, biodegradability, thermal, and hydrophobic properties. In addition to physical properties, using the same strand in multiple portions of the knitted component 116 can impart common aesthetic or tactile properties, such as color, sheen, and texture. Using the same knit structures across different portions of the knitted component 116 may also impart common physical properties and aesthetic properties.

Knitted Component Configurations

Figure 4:
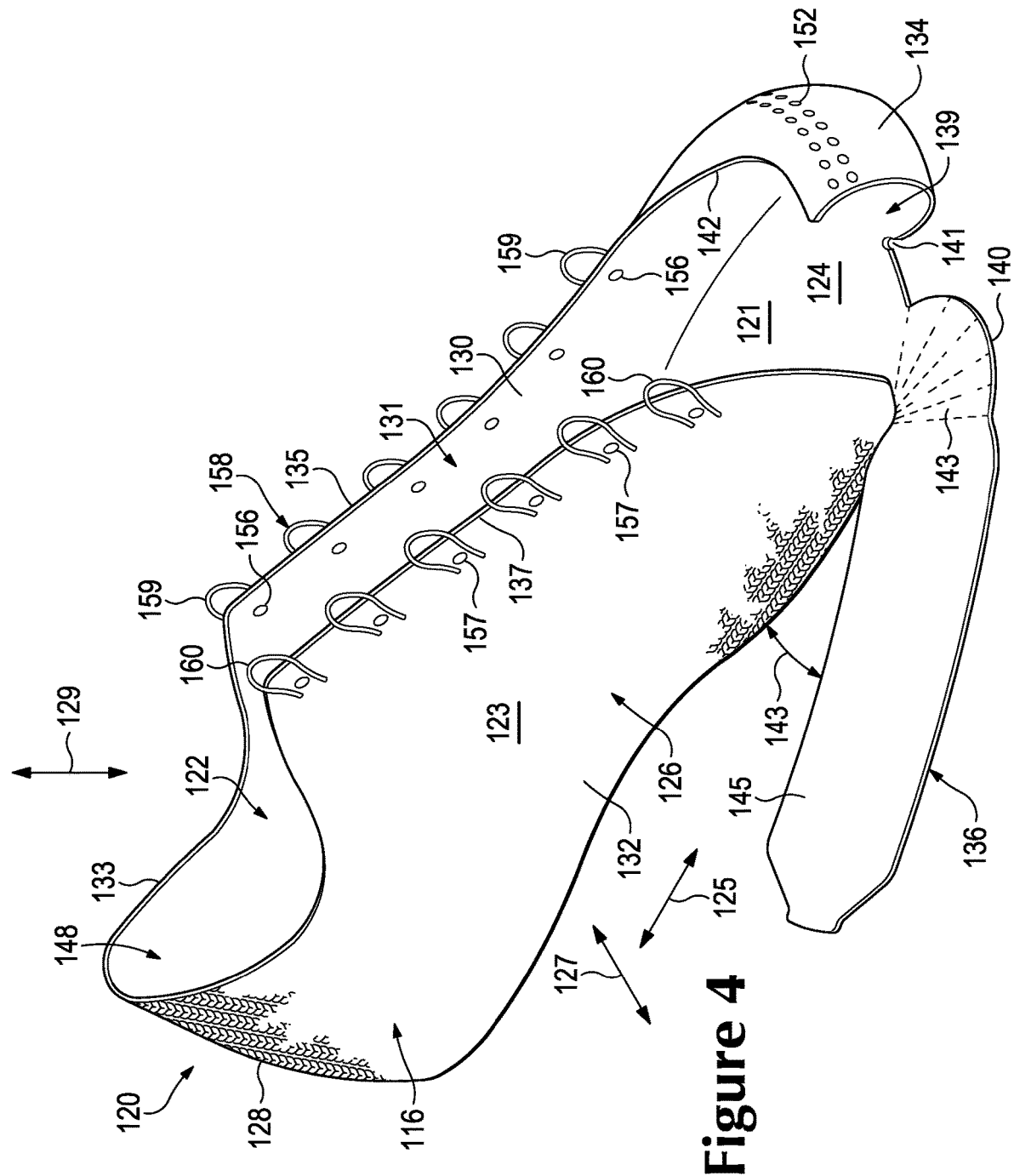
FIG. 4 is a perspective view of a knitted component with inlaid strands of the article of footwear of FIG. 1.
Figure 5:
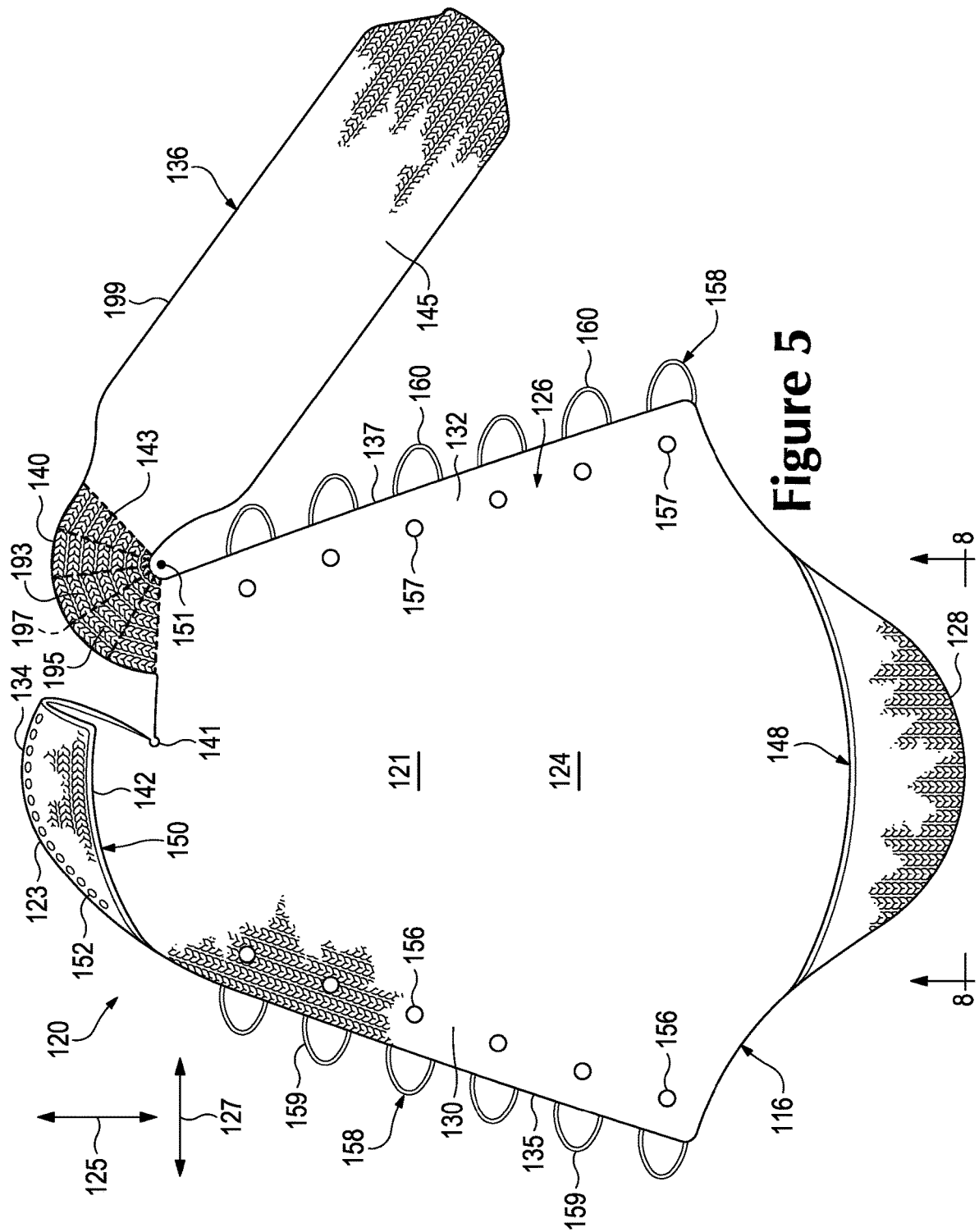
FIG. 5 is a top plan view of the knitted component of FIG. 4.
Figure 6:
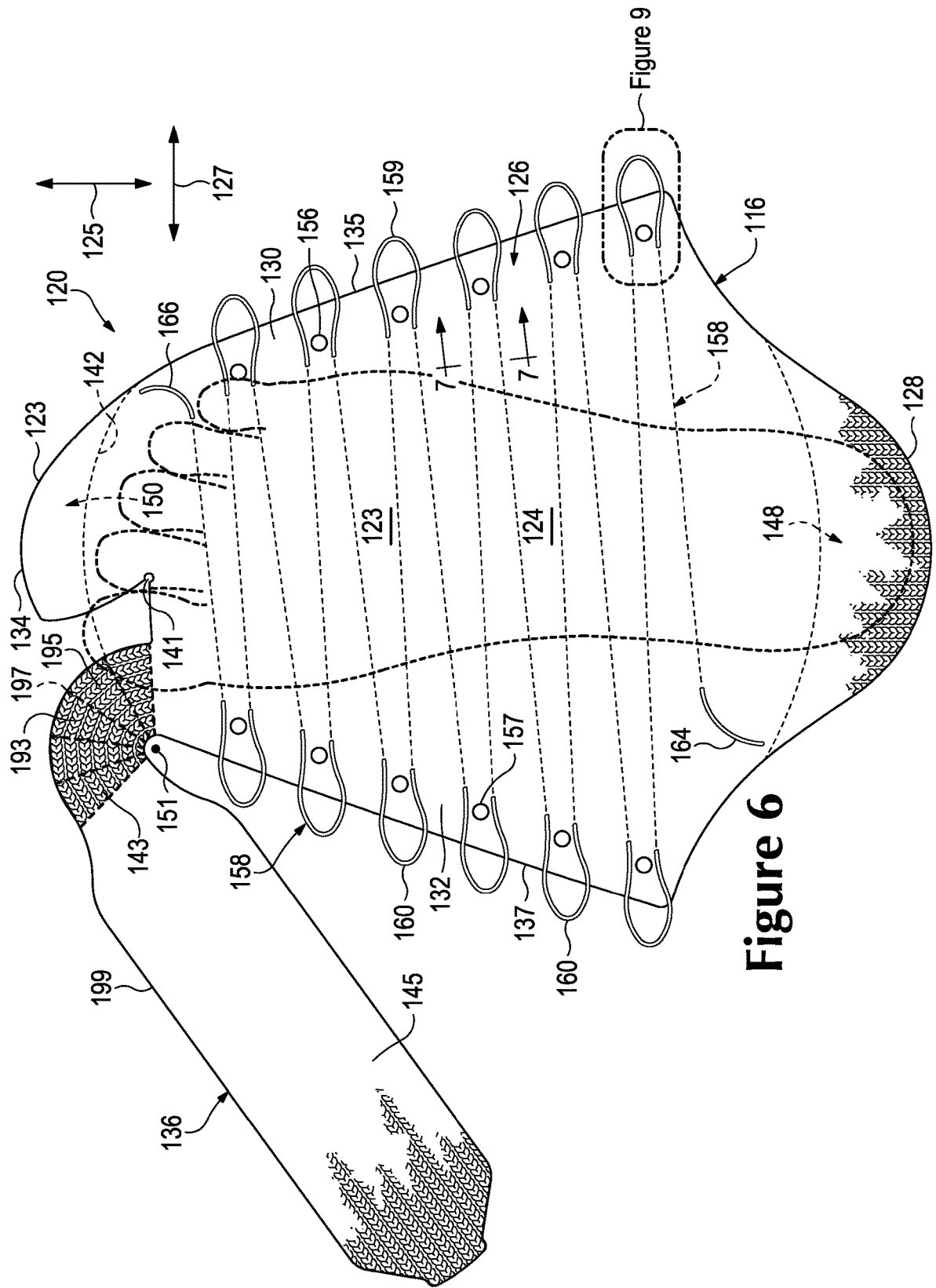
FIG. 6 is a bottom plan view of the knitted component of FIG. 4 with a footprint shown in phantom.

FIGS. 4-6 illustrate various embodiments of knitted components 116 that may be incorporated into articles of footwear in a similar manner as the exemplary embodiment of FIGS. 1 through 3. The knitted component 116 illustrated in FIGS. 4-6 are depicted separate from a remainder of footwear 100. However, it should be understood that each of the embodiments of knitted component 116 described herein may be combined with the elements of footwear 100, described above, to form an article of footwear 100 incorporating the knitted component 116.

The knitted component 116 can be of "unitary knit construction." As defined herein and as used in the claims, the term "unitary knit construction" means that the knitted component 116 is formed as a one-piece element through a knitting process. That is, the knitting process substantially forms the various features and structures of knitted component 116 without the need for significant additional manufacturing steps or processes. A unitary knit construction may be used to form a knitted component having structures or elements that include one or more courses of yarn or other knit material that are joined such that the structures or elements include at least one course or wale in common (i.e., sharing a common strand or common yarn) and/or include courses or wales that are substantially continuous between each portion of the knitted component 116. With this arrangement, a one-piece element of unitary knit construction is provided.

Although portions of knitted component 116 may be joined to each other following the knitting process, knitted component 116 remains formed of unitary knit construction because it is formed as a one-piece knit element. Moreover, knitted component 116 remains formed of unitary knit construction when other elements (e.g., an inlaid strand, a closure element, logos, trademarks, placards with care instructions and material information, and other structural elements) are added following the knitting process.

FIGS. 4-6 illustrate exemplary embodiments of the knitted component 116 as defining a majority of the upper 120 of the article of footwear 100. As shown, the knitted component 116 of the upper 120 can include a strobel portion 124 and one or more side portions 126. The strobel portion 124 can be configured to extend underneath the wearer's foot, and the side portion(s) 126 can be configured to at least partially cover over the wearer's foot. Also, the strobel portion 124 and side portion(s) 126 can cooperate to define a void 122 that receives the wearer's foot. Again, the strobel portion 124 and the side portion(s) 126 can be formed of a unitary knit construction as discussed above.

As shown in the illustrated embodiments, the side portions 126 of the knitted component 116 can include a heel portion 128, a lateral portion 130, a medial portion 132, a forefoot portion 134, and a tongue portion 136, each of which are formed of the same unitary knit construction as the strobel portion 124. As such, the knitted component 116 can fit and conform closely to the wearer's foot. Also, because of this construction, the knitted component 116 can be formed relatively quickly to increase manufacturing efficiency.

Also, as shown in FIG. 6 and as will be discussed in detail, the knitted component 116 can include one or more strands 158 that are incorporated with the unitary knit construction of the knitted component 116. For instance, the strands 158 can be inlaid within the courses and/or wales of the knitted component 116 as will be discussed. Also, the strands 158 can be attached to the interior and/or exterior surface of the knitted component 116.

The strand(s) 158 can be disposed in the upper to extend across the sides and/or under the wearer's foot. Also, the strand(s) 158 can be operably coupled to a closure member 154, such as a shoelace 155. Thus, tensioning the shoelace 155 can, in turn, tension the strand(s) 158. As a result, the strand(s) 158 can provide support to the wearer's foot for increased comfort and better fit.

The illustrated embodiments of the upper 120 and the footwear 100 is configured to be worn on a left foot of the wearer. However, it will be appreciated that the footwear 100 can be configured to be worn on the right foot and can include similar features as the illustrated embodiments.

The footwear 100 can also be configured as a running shoe. However, the footwear 100 may also be applied to a variety of other athletic footwear types, including baseball shoes, basketball shoes, cycling shoes, football shoes, tennis shoes, soccer shoes, training shoes, walking shoes, and hiking boots, for example. The concepts may also be applied to footwear types that are generally considered to be non-athletic, including dress shoes, loafers, sandals, and work boots. Accordingly, the concepts disclosed with respect to footwear 100 apply to a wide variety of footwear types.

Figure 13:
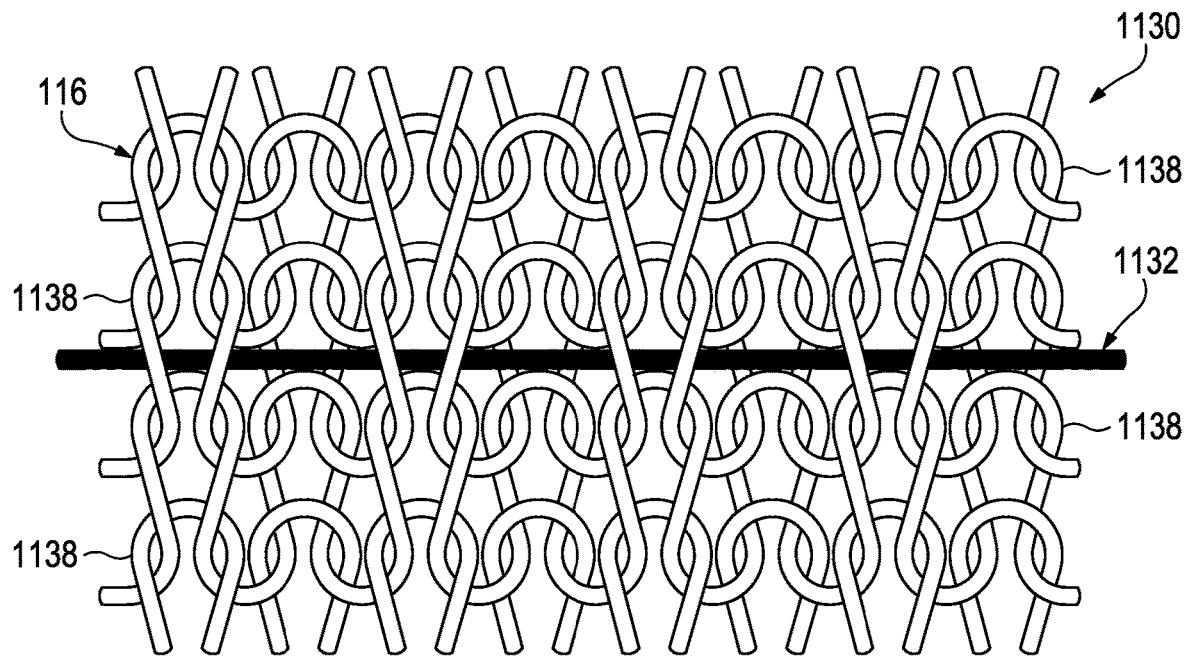
FIGS. 13 and 14 are schematic views of a unitary knit construction with inlaid strands.

In exemplary embodiments schematically illustrated in FIG. 13, the primary element of knitted component 116 may be formed from at least one yarn 1138 or other strand that is manipulated (e.g., with a knitting machine) to form a plurality of intermeshed loops that define a variety of courses and wales. Although yarn 1138 forms each of the courses and wales in this configuration, additional yarns may form one or more of the courses and/or wales.

The properties that a particular type of yarn will impart to an area of a knitted component partially depend upon the materials that form the various filaments and fibers within the yarn. Cotton, for example, provides a soft hand, natural aesthetics, and biodegradability. Elastane and stretch polyester each provide substantial stretch and recovery, with stretch polyester also providing recyclability. Rayon provides high luster and moisture absorption. Wool also provides high moisture absorption, in addition to insulating properties and biodegradability. Nylon is a durable and abrasion-resistant material with relatively high strength. Polyester is a hydrophobic material that also provides relatively high durability.

Figure 14:
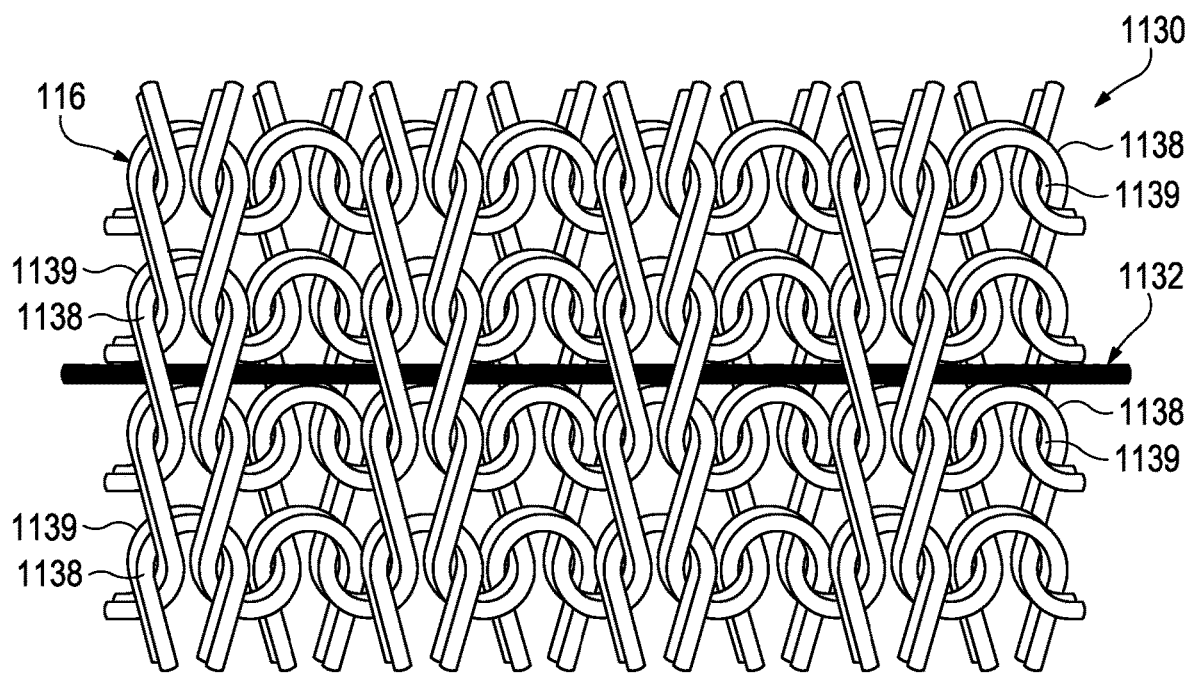

Additional examples of a suitable configuration for a portion of knitted component 116 is depicted in FIG. 14. In this configuration, knitted component 116 includes yarn 1138 and another yarn 1139 (i.e., plural strands). Yarns 1138 and 1139 are plated and cooperatively form a plurality of intermeshed loops defining multiple horizontal courses and vertical wales. That is, yarns 1138 and 1139 run parallel to each other. An advantage of this configuration is that the properties of each of yarns 1138 and 1139 may be present in this area of knitted component 1130. For example, yarns 1138 and 1139 may have different colors, with the color of yarn 1138 being primarily present on a face of the various stitches in knit element 1131 and the color of yarn 1139 being primarily present on a reverse of the various stitches in knit element 1131. As another example, yarn 1139 may be formed from a yarn that is softer and more comfortable against the foot than yarn 1138, with yarn 1138 being primarily present on first surface 1136 and yarn 1139 being primarily present on second surface 1137.

Moreover, as shown in FIGS. 13 and 14, a strand 1132 can be incorporated in the unitary knit construction of the knitted component 116. The strand 1132 can be a tensile strand element that provides support to the knitted component 116. Stated differently, tension within the strand 1132 can allow the knitted component 116 to resist deformation, stretching, or otherwise provide support for the wearer's foot during running, jumping, or other movements of the wearer's foot. Also, it will be appreciated that the strand 158 of FIG. 6 (mentioned above and described in detail below) can be incorporated in the knitted component 116 similar to the strand 1132 of FIGS. 13 and 14.

As will be discussed, the strand 1132 can be incorporated or inlaid into the unitary knit construction of the knitted component 116 such that the strand 1132 can be included during the knitting processes on the knitting machine. For instance, the strand 1132 can be inlaid within the unitary knit construction such that the strand 1132 extends along one of the courses as shown in FIGS. 13 and 14 and/or the wales of the knitted component 116. As shown in FIGS. 13 and 14, the strand 1132 and can alternate between being located (a) behind loops formed from yarn 1138 and (b) in front of loops formed from yarn 1138. In effect, inlaid strand 1132 weaves through the unitary knit construction of knit element 1131.

Embodiments of Upper and Knitted Component

Various embodiments of the upper 120 and knitted component 116 will now be discussed in greater detail. As shown, the upper 120 can define a longitudinal direction 125, a transverse direction 127, and a vertical direction 129, which will be used for referencing different features of the upper 120 in the below discussion. The terms "superior,"

"inferior," "lateral," "medial," "anterior," and "posterior" will also be used herein according to their anatomical meanings.

As mentioned above, the knitted component 116 of the upper 120 can include a strobel portion 124, which is configured to be disposed underneath the wearer's foot. An outline of the wearer's foot is shown in FIG. 6, such that the strobel portion 124 is at least generally defined relative to the wearer's foot. Thus, the strobel portion 124 can extend continuously underneath one or more portions of the heel, the sole, the toes, the arch, and/or other inferior surfaces of the wearer's foot.

The knitted component 116 can also include various side portions 126 that extend peripherally from the strobel portion 124. The side portions 126 can be configured to cover over and lie against at least a portion of the wearer's foot. In the embodiments illustrated, the side portions 126 of the knitted component 116 can substantially encompass the strobel portion 126. Also, it will be appreciated that the strobel portion 124 and the side portions 126 can collectively define the interior surface 121 of the knitted component 116 as well as the exterior surface 123 of the knitted component 116.

For instance, the side portions 126 can include a heel portion 128, which is disposed posteriorly relative to the strobel portion 124. The heel portion 128 can also extend superiorly from the strobel portion 124 as shown in FIG. 4. The heel portion 128 can be configured to cover over a heel and/or an ankle area of the wearer's foot.

The side portions 126 of the knitted component 116 can also include a lateral portion 130, which is disposed anteriorly relative to the heel portion 128, and which can extend superiorly from the strobel portion 124 as shown in FIG. 4. The lateral portion 130 can be configured to cover over and lie against a lateral area of the wearer's foot.

Furthermore, the side portions 126 of the knitted component 116 can include a medial portion 132, which is disposed anteriorly relative to the heel portion 128, which can extend superiorly from the strobel portion 124 as shown in FIG. 4. The medial portion 132 can be disposed on an opposite side of the strobel portion 124 in the transverse direction 127. The medial portion 132 can be configured to cover over and lie against a medial area or instep of the wearer's foot.

The heel portion 128, lateral portion 130, and medial portion 132 can collectively define a horseshoe-shaped collar 133 of the upper 120. The collar 133 can provide access into and out of the void 122 of the upper 120. Moreover, a lateral edge 135 of the lateral portion 130 and a medial edge 137 of the medial portion 132 can collectively define a throat 131 of the upper 120. The throat 131 can extend substantially parallel to the longitudinal direction 125, or the throat 131 can be disposed at an angle relative to the longitudinal direction 125. Also, although the throat 131 is substantially centered over the strobel portion 124 in the embodiments of FIG. 4, the throat 131 can be disposed to one side relative to the strobel portion 124 in the transverse direction 127. As will be discussed, the width of the throat 131 can be selectively varied by the closure member 154 so as to move the lateral and medial edges 135, 137 toward and away from each other. As a result, the footwear 100 can be selectively tightened on the wearer's foot and loosened from the wearer's foot.

Additionally, the side portions 126 of the knitted component 116 can include a forefoot portion 134. The forefoot portion 134 can be disposed anteriorly relative to the lateral and medial portions 130, 132 as shown in FIG. 1. Also, the forefoot portion 134 can be integrally connected to either the lateral portion 130 or the medial portion 132, and the forefoot portion 134 can be spaced from the other. In the embodiments shown, for instance, the forefoot portion 134 is integrally connected to the lateral portion 130 and is spaced from the medial portion 132. Accordingly, when the upper 120 is in a disassembled state as shown in FIG. 4, a gap 139 can be defined between the forefoot portion 134 and the medial portion 132.

Still further, the side portions 126 of the knitted component 116 can include a tongue portion 136. As shown in FIG. 4, the tongue portion 136 can include a curved region 143 and a longitudinal region 145. When the upper 120 is disassembled as shown in FIG. 4, the tongue portion 136 can extend anteriorly from the strobel portion 124, and the curved region 143 can be disposed within the gap 139 between the medial and forefoot portions. The curved region 143 can also curve such that the longitudinal region 145 extends generally posteriorly and at an angle 143 relative to the medial portion 132. Also, when the upper 120 is assembled, the curved region 143 can wrap superiorly to at least partially fill the gap 139, and the longitudinal region 145 of the tongue portion 136 can be disposed within the throat 131 of the upper to cover over the wearer's foot between the lateral portion 130 and the medial portion 132. Moreover, when the upper 120 is assembled, the longitudinal region 145 of the tongue portion 136 can be detached and decoupled from the lateral and/or medial portions 130, 132 as shown in FIG. 3.

As shown in FIGS. 4, 5, and 6, the strobel portion 124 and the heel portion 128 can define a heel cavity 148 that is configured to receive a heel of the wearer's foot (see FIG. 6). The heel cavity 148 can have three dimensional curvature, can have a convex outer surface, and/or can have a substantially hemispherical shape. Thus, as the heel portion 128 extends in the vertical direction 129 from the strobel portion 124, the heel portion 128 can curve anteriorly slightly. Also, as the heel portion 128 extends in the transverse direction 127, both sides of the heel portion 128 can curve anteriorly in the longitudinal direction 125 to join to the lateral and medial portions 130, 132. Accordingly, the heel cavity 148 can conform and approximately correspond to the shape of the wearer's heel and ankle.

Furthermore, as shown in FIGS. 4, 5, and 6, the strobel portion 124 and the forefoot portion 134 can define a forefoot cavity 150 that is configured to receive the toes and other forefoot regions of the wearer's foot (see FIG. 6). The forefoot cavity 150 can have three dimensional curvature and can have a convex outer surface. Thus, as the forefoot portion 134 extends in the vertical direction 129 from the strobel portion 124, the forefoot portion 134 can curve posteriorly. Also, as the forefoot portion 134 extends in the transverse direction 127, the forefoot portion 134 can curve posteriorly in the longitudinal direction 125 to join to the lateral portion 130.

Figure 8:
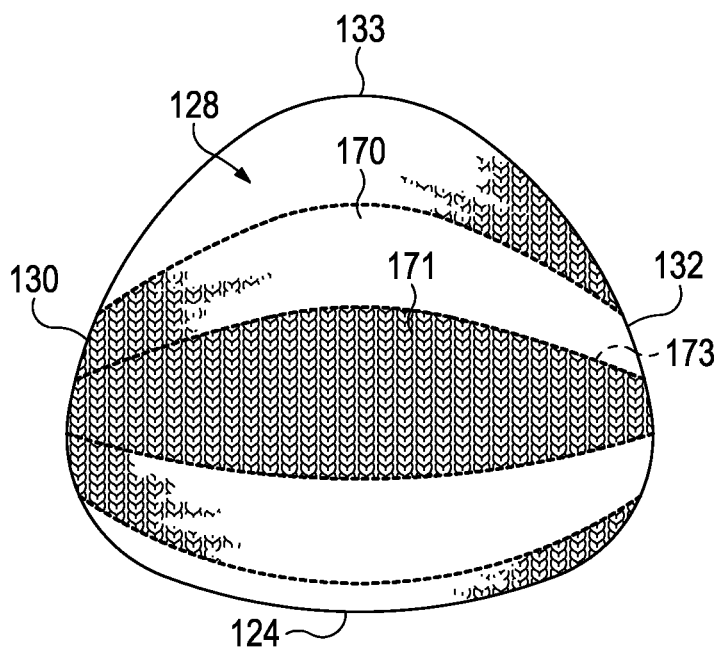
FIG. 8 a schematic view of a heel portion of the knitted component taken from the perspective of the line 8-8 of FIG. 5.

The three dimensional curvature of the heel cavity 148 and/or the forefoot cavity 150 can be formed due to the unitary knit construction of the knitted component 116. For instance, as shown in FIG. 8, the heel portion 128 can include at least two tapered areas 170, 171. The tapered areas can have boundaries 173 that taper generally in the transverse direction 127 as indicated by broken lines. The tapering of the areas 170, 171 can be achieved by dropping stitches within successive courses as the heel portion 128 is formed along the boundaries 173. Also, the areas 170, 171 can be joined along the boundaries 173 and joined to have uniform knit construction with each other, and yet, the heel portion 128 can curve three dimensionally as discussed above. The forefoot portion 134 can similarly include tapered areas; however, such tapered areas can taper in the vertical direction 129 in exemplary embodiments.

Also, in some embodiments, the forefoot portion 134 can include a plurality of openings 152 that are arranged to assist with increasing curvature of the forefoot portion 134. In the embodiments illustrated, the plurality of openings 152 can include one or more rows of through-holes. Because the openings 152 reduce the amount of knitted material at those areas of the forefoot portion 134, the forefoot portion 134 can readily curve posteriorly.

The knitted component 116 can additionally include at least two edges 140, 142 that are configured to be joined together when assembling the upper 120. The edges 140, 142 can be defined in any suitable location on the strobel portion 124 and/or any suitable location on the side portions 126. For instance, a first edge 140 and a second edge 142 are shown detached for clarity in FIG. 4. The first edge 140 can extend along the curved region 143 of the tongue portion 136 and can also extend partially through the strobel portion 124 in the transverse direction 127, adjacent the forefoot portion 134. The second edge 142 can curve along the forefoot portion 134, generally in the transverse direction 127 and can extend inferiorly along the forefoot portion 134 so as to partially define the gap 139. The first edge 140 and the second edge 142 can also meet at a notch 141 defined within the strobel portion 124 as shown in FIG. 4.

As mentioned above, the footwear 100 can further include a closure member 154, which is illustrated in FIG. 1. The closure member 154 can selectively secure the upper 120 to the wearer's foot and selectively release the upper 120 from the wearer's foot.

As shown in FIG. 1, the closure member 154 can be a shoelace 155. As such, the lateral portion 130 can include one or more lateral closure openings 156, such as through-holes that are disposed in a row extending along the lateral edge 135. The medial portion 132 can include similar medial closure openings 157 that are disposed in a row extending along the medial edge 137. The openings 156, 157 can receive the shoelace 155 such that the shoelace 155 can criss-cross, zigzag, and alternate between the lateral and medial portions 130, 132.

It will be appreciated that the openings 156, 157 could be configured differently from the through-holes shown in FIG. 1. For instance, the openings 156, 157 could be defined by hoops, grommets, hooks, and other suitable features that are configured to receive a closure member and that are either integrated into the knitted component 116 or are removably attached to the knitted component 116.

Also, it will be appreciated that the closure member 154 could include structure other than the shoelace 155 without departing from the scope of the present disclosure. For instance, the closure member 154 could be a strap, a buckle, pile tape, or other suitable closure member.

Still further, as shown in FIG. 6, the upper 120 can include at least one strand 158 that is coupled to the strobel portion 124 and/or the side portions 126. The strand 158 can be coupled to any portion of the strobel portion 124 and/or the side portion 126. Additionally, the strand 158 can be coupled to the strobel portion 124 and/or the side portion 126 in any suitable fashion. For instance, the strand 158 can be inlaid within courses and/or wales of the unitary knit construction of the strobel and side portions 126 as will be discussed. Thus, the strand 153 can correspond to the strand 1132 described above and shown in FIGS. 13 and 14. The strand 158 can also be adhered, fastened, pierced through, or otherwise coupled to the strobel portion 124 and/or the side portion 126.

The strand 158, knitted component 116, and upper 120 can incorporate the teachings of one or more of commonly-owned U.S. patent application Ser. No. 12/338,726 to Dua et al., entitled "Article of Footwear Having An Upper Incorporating A Knitted Component", filed on Dec. 18, 2008 and published as U.S. Patent Application Publication Number 2010/0154256 on Jun. 24, 2010, and U.S. patent application Ser. No. 13/048,514 to Huffa et al., entitled "Article Of Footwear Incorporating A Knitted Component", filed on Mar. 15, 2011 and published as U.S. Patent Application Publication Number 2012/0233882 on Sep. 20, 2012, both of which applications are hereby incorporated by reference in their entirety (collectively referred to herein as the "Inlaid Strand cases").

The strand 158 can be an elongate and flexible. Also, the strand 158 can include at least one yarn, cable, wire, string, cord, filament, fiber, thread, rope, and the like. Also, the strand 158 can be formed from rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, steel, or other suitable material. An individual filament utilized in the strand 158 may be formed form a single material (i.e., a monocomponent filament) or from multiple materials (i.e., a bicomponent filament). Similarly, different filaments may be formed from different materials. As an example, yarns utilized as strand 158 may include filaments that are each formed from a common material, may include filaments that are each formed from two or more different materials, or may include filaments that are each formed from two or more different materials. Similar concepts also apply to threads, cables, ropes, etc. The thickness (diameter) of strand 158 can be within a range from approximately 0.03 millimeters to 5 millimeters, for example. Also, the strand 158 can have a substantially circular cross section, an ovate cross section, or a cross section of any other suitable shape.

As an example, the strand 158 may be formed from a bonded nylon 6.6 with a breaking or tensile strength of 3.1 kilograms and a weight of 45 tex. The strand 158 can also be formed from a bonded nylon 6.6 with a breaking or tensile strength of 6.2 kilograms and a tex of 45. As a further example, the strand 158 may have an outer sheath that sheathes and protects an inner core.

In some embodiments, the strand 158 can have a fixed length (e.g., can be nonextendible). Also in some embodiments, the strand 158 can be resiliently extendible.

Additionally, in some embodiments, the strand 158 can include a thermoplastic material that is configured to adhere, bond, or fuse to the strobel portion 124 and/or the side portions 126 of the upper 120. For instance, selective application of heat can cause materials in the strand 158 to fuse to the materials of the strobel portion 124 and/or the side portions 126. The strand 158 can, thus, be included according to the teachings of U.S. Patent Publication No. 2012/0233882, which published on Sep. 20, 2012, and which is incorporated herein by reference in its entirety.

As shown in the embodiments of FIG. 6, the upper 120 can include a single strand 158 that extends continuously between the medial portion 132, the strobel portion 124, and the lateral portion 130. Also, the strand 158 can include one or more turns 159, 160. The turns 159, 160 can be one hundred eighty degree turns or greater. Specifically, the strand 158 can include a plurality of lateral turns 159 that are arranged in a row along the lateral edge 135, and the strand 158 can include a plurality of medial turns that are arranged in a row along the medial edge 137. The strand 158 can also extend linearly between pairs of the turns 159, 160. Additionally, the strand 158 can include a first terminal end 164 that is disposed on the strobel portion 124, adjacent the heel portion 128, and the strand 158 can include a second terminal end 166 that is disposed on the strobel portion 124, adjacent the forefoot portion 134. The strand 158 can also alternatingly extend and zigzag between the lateral and medial portions 130, 132.

Figure 7:
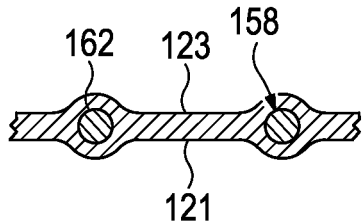
FIG. 7 is a section view of the knitted component taken along the line 7-7 of FIG. 6.

Furthermore, as shown in FIGS. 6 and 7, the knitted component 116 can define a passage 162 between the interior surface 121 and the exterior surface 123. The passage 162 can be defined in any suitable fashion. For instance, the interior surface 121 and the exterior surface 123 can be defined by overlaying layers of knit monofilament material with spacer threads connecting these monofilament layers (a so-called "spacer knit material"), and the passage 162 can be defined between these monofilament layers. In additional embodiments, the interior surface 121 and the exterior surface 123 can be interconnected stitched surfaces, and the passage 162 can be defined between these surfaces.

The passage 162 can extend across any portion of the upper 120. For instance, as indicated by broken lines in FIG. 6, the upper 120 can define a plurality of passages 162, and each passage 162 can extend continuously between the lateral portion 130, the strobel portion 124, and the medial portion 132.

As shown in FIG. 7, the strand 158 can be received and can extend longitudinally within one or more of the passages 162 so as to extend between the lateral portion 130, the strobel portion 124, and the medial portion 132. Also, the turns 159, 160 of the strand 158 can be exposed from the passages 162.

The lateral turns 159 can extend at least partially around respective ones of the lateral closure openings 156, and the medial turns 160 can extend at least partially around respective ones of the medial closure openings 157. Furthermore, as shown in FIG. 1, the shoelace 155 can be received within respective pairs of the lateral closure openings 156 and the lateral turns 159, and the shoelace 155 can also be received within respective pairs of the medial closure openings 157 and the medial turns 160. Stated differently, each pairing of lateral turn 159 and lateral closure opening 156 can cooperatively receive and support the shoelace 155, and each pairing of medial turn 160 and medial closure opening 157 can also receive and support the shoelace 155.

Figure 9:
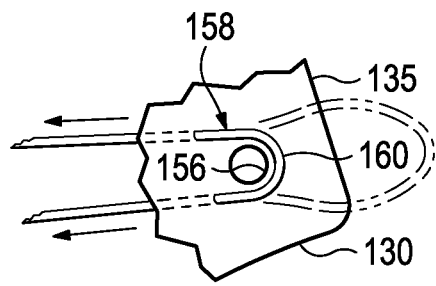
FIG. 9 is a detail view of a portion of the knitted component taken from FIG. 6.

In some embodiments, the strand 158 can be loosely and moveably received within the respective passages 162. For instance, the strand 158 can slide longitudinally through the passages 162. Thus, as shown in FIG. 9, the turns 159, 160 can be pulled closer to the respective closure opening 156, 157. In additional embodiments, the first and/or the second terminal end 164, 166 of the strand 158 can be fixed (e.g., fused) to the strobel portion 124 while remaining portions of the strand 158 can remain moveable relative to the strobel, lateral, and medial portions 124, 130, 132. In still additional embodiments, portions of the strand 158 between the terminal ends 164, 166 can be fused or otherwise fixed to the strobel, lateral, and medial portions 124, 130, 132.

Figure 10:
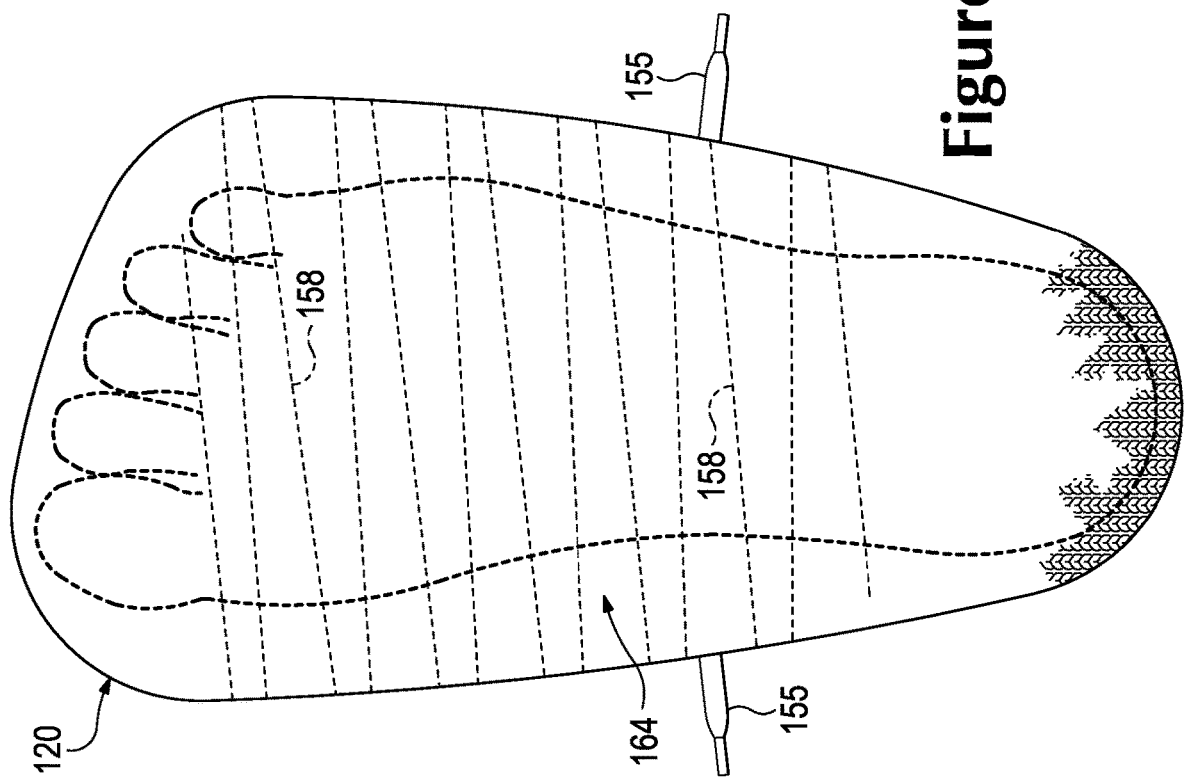

Accordingly, tensioning the shoelace 155 can, in turn, increase tension in the strand 158. For instance, as shown in FIG. 10, when the shoelace 155 is loose and in the unsecured position, tension in the strand 158 can be relatively low, thereby allowing the upper 120 to fit loosely about the wearer's foot. However, when the shoelace 155 is pulled and tensioned as indicated by arrows 174, 175, the shoelace 155 can pull on the turns 159, 160 to increase tension in the strand 158. As a result, the strand 158 can pull and conform the upper 120 closely to the wearer's foot as indicated by arrows 176, 177, 178, 179 in FIG. 11.

Figure 11:
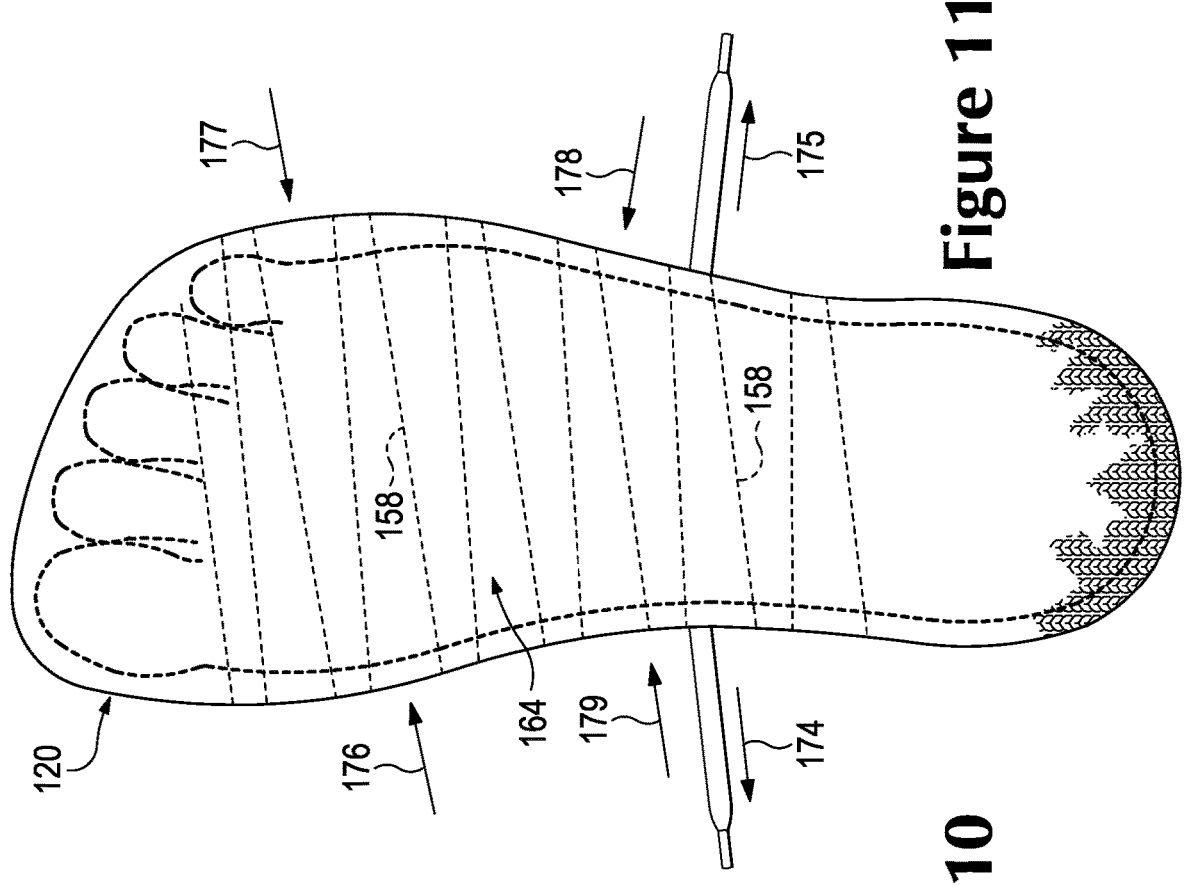

It will be appreciated that in the embodiments shown in FIGS. 10 and 11, the strand 158 can provide support for various areas on the bottom of the wearer's foot. For instance, the strand 158 can be disposed on an arch region 164 that is configured to be disposed underneath the arch of the wearer's foot. Thus, the strand 158 within the arch region 164 can support the wearer's arch, especially when the strand 158 is tensioned by the shoelace 155.

It will also be appreciated that, in the embodiments illustrated, the upper 120 can include only one continuous strand 158 for providing such support to the foot. Accordingly, the part count of the upper 120 can be relatively low, and the upper 120 can be constructed in an efficient manner.

Figure 12:
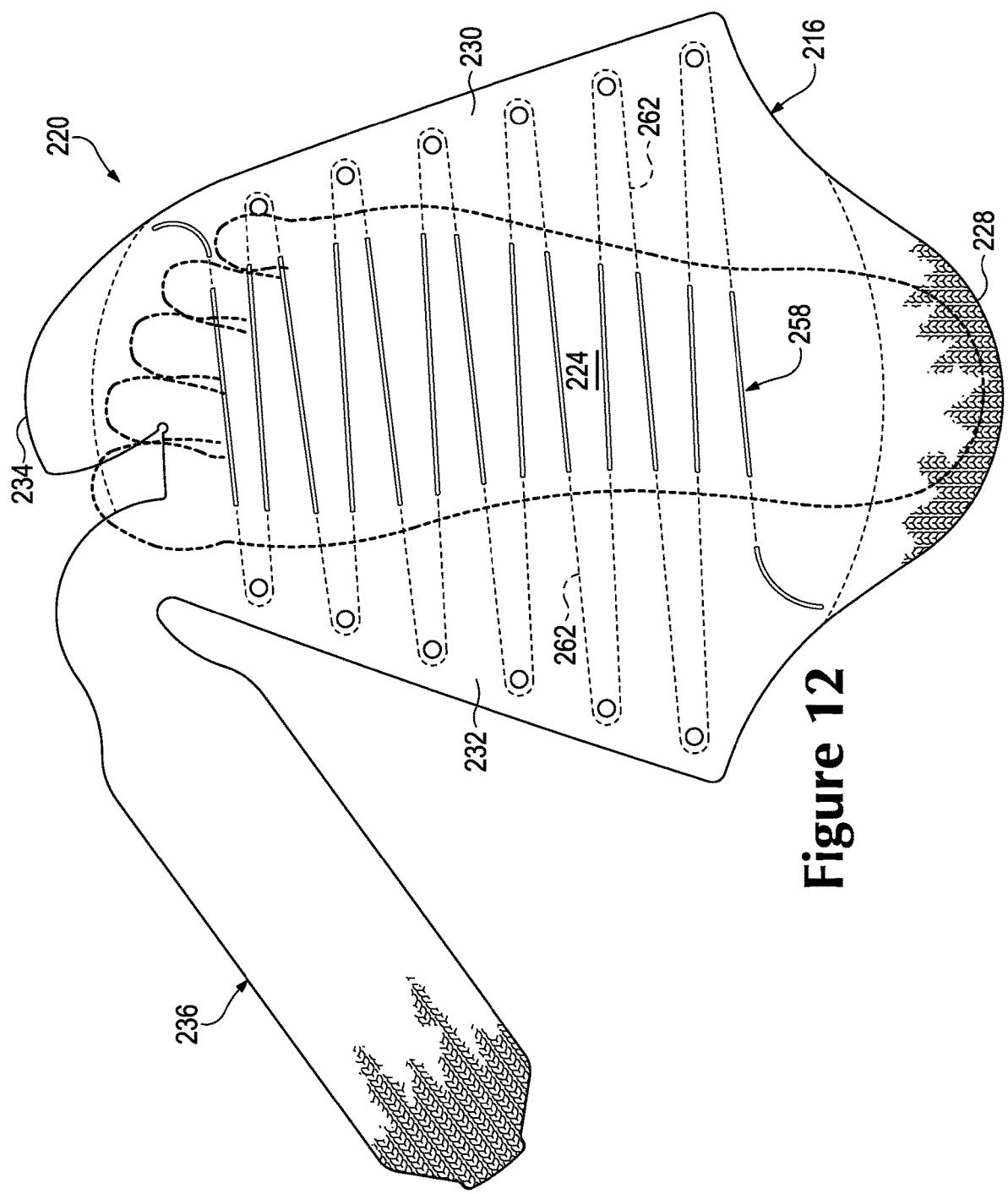
FIG. 12 is a side view of a knitted component with inlaid strands according to additional embodiments of the present disclosure.

Additional embodiments of the knitted component 116 of the upper 220 are illustrated in FIG. 12. The knitted component 116 and upper 220 can be substantially similar to the knitted component 116 and upper 120 described above, except as discussed.

The upper 220 can include a strand 258 that alternatingly extends across the medial portion 232, the strobel portion 224, and the lateral portion 230, similar to the embodiments discussed above. The strand 258 can also extend through one or more passages 262. However, the passages 262 can be defined on the medial portion 132 and the lateral portion 130, and the passages 262 can be spaced away from the strobel portion 224.

Accordingly, longitudinal portions of the strand 258 extending across the strobel portion 224 can be exposed from the passages 262. Thus, in some embodiments, these portions of the strand 258 can be free to be attached directly to the sole structure.

Furthermore, as shown in FIG. 12, in some embodiments, the passages 262 can be V-shaped such that the turns of the strand 258 are embedded and enclosed within the passages 262 unlike the exposed turns 159, 160 shown above in FIGS. 1-6.

Assembly of the Footwear

Assembly of the footwear 100, the knitted component 116 and upper 120 will now be discussed according to exemplary embodiments. For purposes of clarity, it will be assumed that the knitted component 116 and the strand 158 have been formed to the disassembled state shown in FIGS. 5 and 6.

To begin exemplary embodiments of the assembly of the upper 120, the lateral and medial portions 130, 132 can be moved (folded) superiorly to the position shown in FIG. 4. Then, the tongue portion 136 can be wrapped superiorly such that the curved region 143 substantially fills the gap 139 and the longitudinal region 145 substantially fills the throat 131. As such, the first and second edges 140, 142 can be disposed directly adjacent each other. Then, the first and second edges 140, 142 can be joined at a seam 144.

In some embodiments, the seam 144 can be formed by stitching the edges 140, 142 together with stitching 146 as shown in FIGS. 1-3. As mentioned above, the upper 120 can be a knitted element with a plurality of stitches; however, it will be appreciated that the stitching 146 can be independent of the stitches of the knitted component 116. Stated differently, the stitching 146 can be a thread, yarn, cable, or other strand that is used after the knitted component 116 has been knitted. The stitching 146 can be a zigzag stitch or other suitable stitch. Furthermore, the edges 140, 142 can be joined using adhesives, fasteners, or using other implements as well. Additionally, the edges 140, 142 can abut at the seam 144. For instance, the edges 140, 142 can form a butt joint, or the edges 140, 142 can be partially overlapped to form the seam 144. Additionally, the edges 140, 142 can be slightly spaced apart at the seam 144 with a bead of adhesive or other material between the edges 140, 142 at the seam 144.

Moreover, as shown in FIG. 3, the seam 144 can extend continuously from the strobel portion 124 and into the side portion 126 of the knitted component 116. Specifically, a first terminal end 147 of the seam 144 can be disposed in the strobel portion 124, adjacent the forefoot portion 134. A second terminal end 149 of the seam 144 can be disposed at the junction of the lateral edge 135, the forefoot portion 134, and the tongue portion 136. The seam 144 can extend continuously between these ends 147, 149 so as to extend from under the wearer's foot, around a medial area of the wearer's forefoot, to an area above the wearer's forefoot.

Accordingly, in some embodiments, there can be only one, solitary seam 144 necessary for giving the knitted component 116 of the upper 120 the three dimensional shape shown in FIGS. 1-3. This can facilitate manufacturing and reduce time for assembly of the upper 120. Also, the seam 144 can be spaced from the heel portion 128 such that the heel portion 128 is seamless. Thus, even if the heel portion 128 shifts on the wearer's heel, the relatively smooth and seamless heel portion 128 is unlikely to rub on the wearer's heel and provide discomfort to the wearer.

Subsequently, the shoelace 155 can be threaded through the lateral and medial openings 156, 157 and the lateral and medial turns 159, 160 as discussed above. Next, the sole structure 110 can be attached to the upper 120. Specifically, the midsole 112 can be attached to the exterior surface 123 of the strobel portion 124, and the outsole 114 can be attached to the midsole 112. In additional embodiments, an additional sockliner can be inserted over and/or attached to the interior surface 121 of the strobel portion 124.

Additional Embodiments of Knitted Component and Upper

Figures 24, 25:
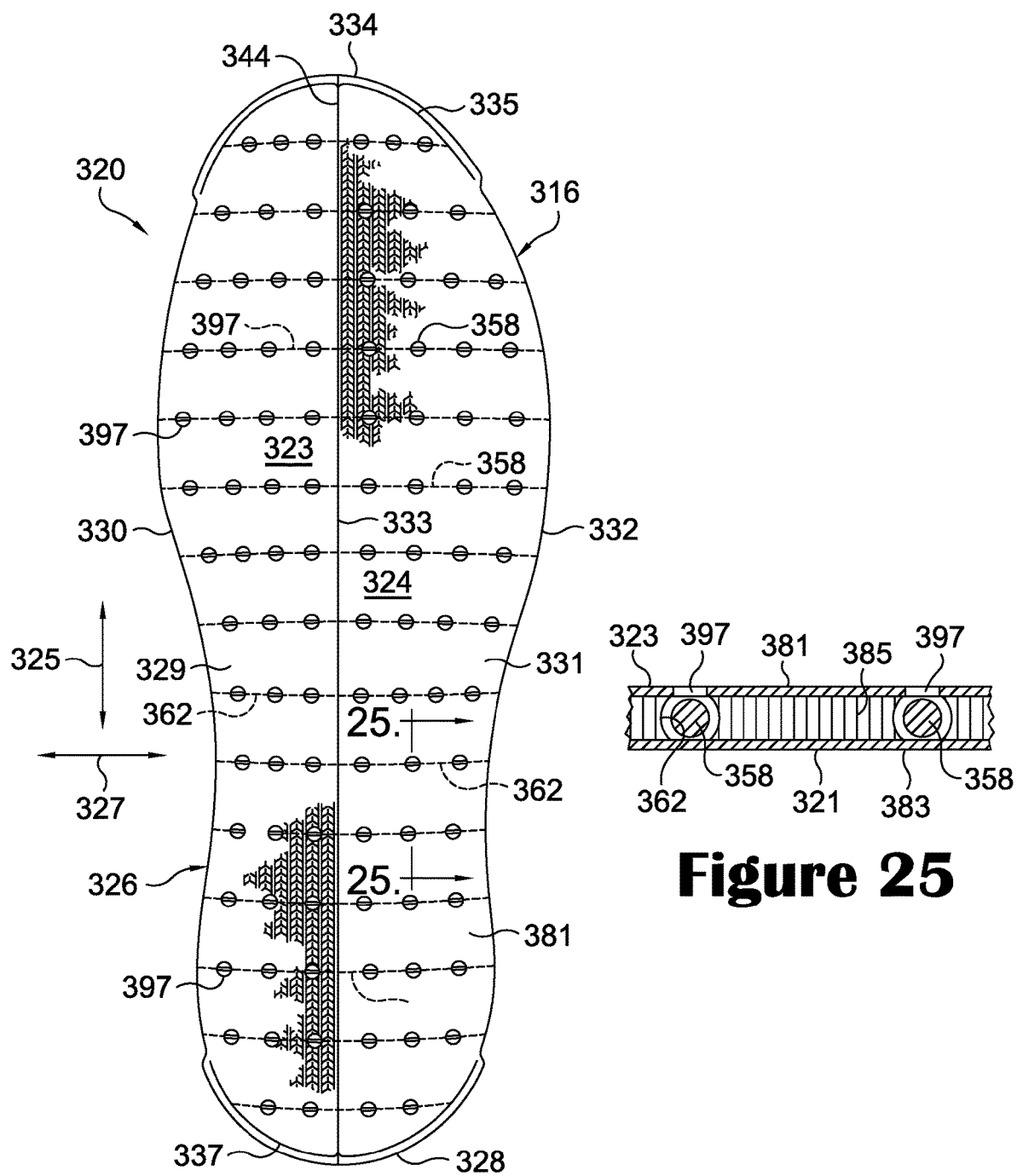
FIG. 24 is a perspective view of a knitted component with inlaid strands according to additional embodiments of the present disclosure.
FIG. 25 is a longitudinal section view of the knitted component of FIG. 25.

Still further embodiments of the knitted component 316 and upper 320 are shown in FIGS. 24 and 25. The knitted component 316 and upper 320 can substantially similar to the knitted component 116 and upper 120 described above, except as discussed.

As shown in FIG. 24, the knitted component can include a strobel portion 324 and a side portion 326 that substantially encompasses the strobel portion 324. The strobel portion 324 and/or side portion 326 can be formed by overlaying layers of knit monofilament material with spacer threads connecting these monofilament layers (a so-called "spacer knit material").

Also, as shown, one or more passages 362 can be defined across the strobel portion 324 and side portion 326. The passages 362 can be defined between the interior and exterior surfaces 321, 323 of the knitted component 216. In the embodiments illustrated, the passages 362 extend continuously between the side portions 326 and the strobel portion 324. Stated differently, portions of the passages 362 are defined by the strobel portion 324 while other portions are defined by the side portions 326. Also, the passages 362 can extend longitudinally from the lateral portion 330, across the strobel portion 324, and to the medial portion 332.

Furthermore, the knitted component 316 can include a plurality of openings 397 that expose different longitudinal areas of the passages 362. These openings 397 can increase the aesthetics of the footwear 100 and can facilitate movement of the strands 358 within the passages 362.

As shown in FIGS. 24 and 25, strands 358 can extend through respective ones of the passages 362. As such, the strands 358 can extend continuously between the lateral portion 330, the strobel portion 324, and the medial portion 322. In additional embodiments, the strands 358 can be localized on the strobel portion 324 and the lateral portion 330 and medial portion 332 can be free of the strands 358.

FIG. 24 shows the knitted component 316 from atop view, and FIG. 25 shows the knitted component 316 as a longitudinal section view. As shown in FIG. 24, a seam 344 can be defined substantially centered on the strobel portion 324 between the lateral and medial portions 330, 332 and extending in the longitudinal direction 325.

Additional Embodiments of Knitted Component and Upper

The knitted component may also include one or more strands or yarns that are formed from at least one of a thermoset polymer material and natural fibers (e.g., cotton, wool, silk). Other yarns or strands may be formed from a thermoplastic polymer material. In general, a thermoplastic polymer material melts when heated and returns to a solid state when cooled. More particularly, the thermoplastic polymer material transitions from a solid state to a softened or liquid state when subjected to sufficient heat, and then the thermoplastic polymer material transitions from the softened or liquid state to the solid state when sufficiently cooled. As such, thermoplastic polymer materials are often used to join two objects or elements together. In this case, yarn may be utilized to join (a) one portion of yarn to another portion of yarn, (b) yarn and inlaid strand to each other, or (c) another element (e.g., logos, trademarks, and placards with care instructions and material information) to knitted component, for example. As such, yarn may be considered a fusible yarn given that it may be used to fuse or otherwise join portions of knitted component to each other. Moreover, yarn may be considered a non-fusible yarn given that it is not formed from materials that are generally capable of fusing or otherwise joining portions of knitted component to each other. That is, yarn may be a non-fusible yarn, whereas other yarn(s) may be a fusible yarn. In some configurations of knitted component, yarn (i.e., the non-fusible yarn) may be substantially formed from a thermoset polyester material and yarn (i.e., the fusible yarn) may be at least partially formed from a thermoplastic polyester material.

The use of plated yarns may impart advantages to knitted component. When yarn is heated and fused to yarn and inlaid strand, this process may have the effect of stiffening or rigidifying the structure of knitted component. Moreover, joining (a) one portion of yarn to another portion of yarn or (b) yarn and inlaid strand to each other has the effect of securing or locking the relative positions of yarn and inlaid strand, thereby imparting stretch-resistance and stiffness. That is, portions of yarn may not slide relative to each other when fused with yarn, thereby preventing warping or permanent stretching of knit element due to relative movement of the knit structure. Another benefit relates to limiting unraveling if a portion of knitted component becomes damaged or one of yarns is severed. Accordingly, areas of knitted component may benefit from the use of both fusible and non-fusible yarns within knit element.

Additionally, it will be appreciated that the knitted component can have varying zones that collectively form the unitary knit construction. For instance, the knitted component can include a combination at least two of the following: a flat knit zone, a tubular knit zone, a 1×1 mesh knit zone, a 2×2 mesh knit zone, a 3×2 mesh knit zone, a 1×1 mock mesh knit zone, a 2×2 mock mesh knit zone, a 2×2 hybrid knit zone, a full gauge knit zone, a ½ gauge knit zones, and the like. Accordingly, the knitted component 116 and upper 120 can be constructed according to the teachings of U.S. Patent Publication No. 2012/0233882, which published on Sep. 20, 2012, and which is hereby incorporated by reference in its entirety.

Referring now to FIGS. 15-23, exemplary automated knitting processes for forming the knitted component 116 with the strand 158 will be discussed. For purposes of discussion, flat knitting processes and flat knitting machines will be discussed, however, the knitted component 116 and strand 158 can be otherwise formed without departing from the scope of the present disclosure. Thus, the knitted component 116 and strand 158 can be formed according to the teachings of U.S. Patent Publication No. 2012/0233882, which published Sep. 20, 2012, and which is hereby incorporated by reference in its entirety.

Figure 15:
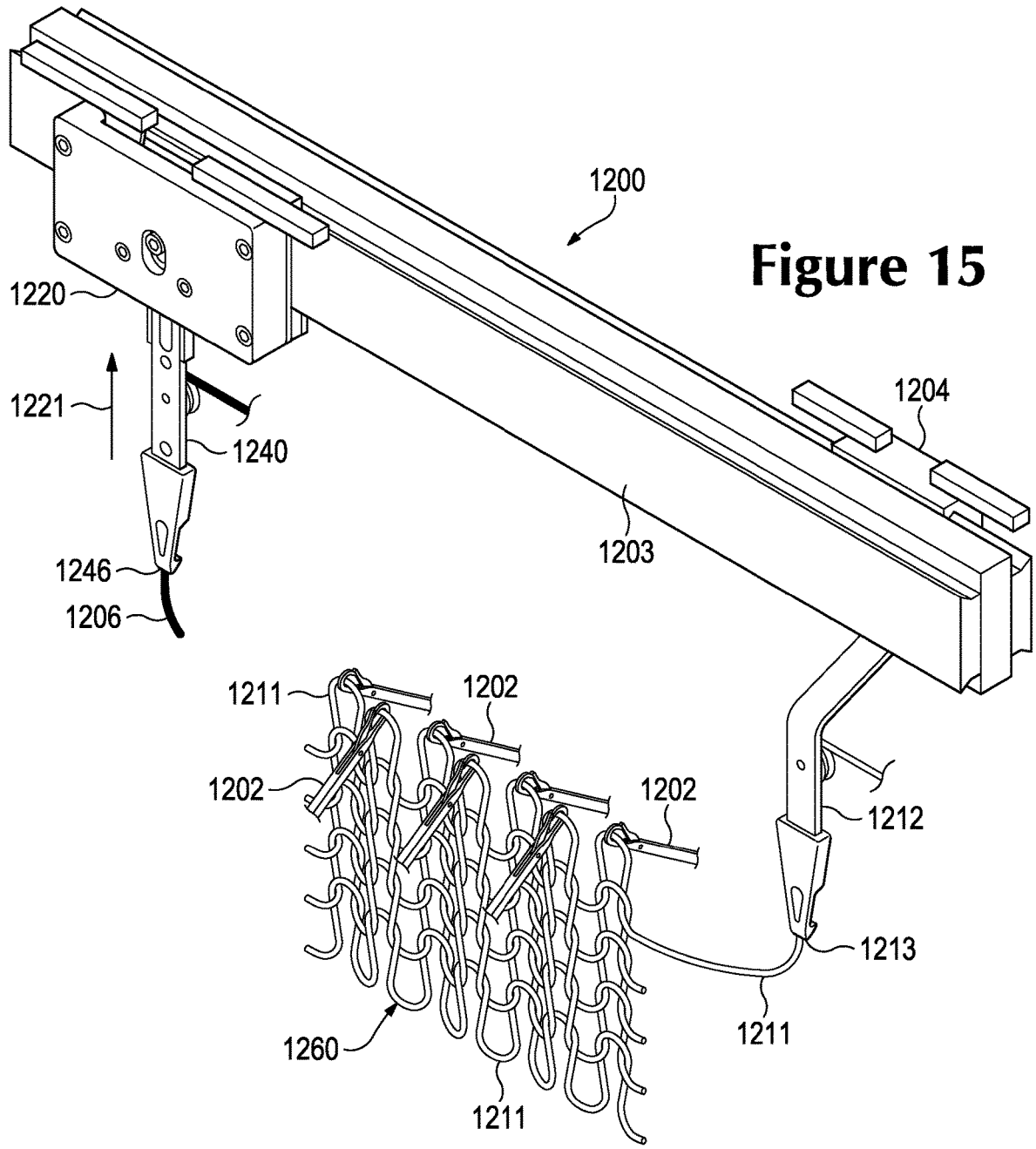
FIGS. 15-23 are perspective schematic views of parts of a flat knitting machine shown during formation of a unitary knit construction with an inlaid strand.

Referring to FIG. 15, a portion of knitting machine 1200 that includes various needles 1202, rail 1203, standard feeder 1204, and combination feeder 1220 is depicted. Whereas combination feeder 1220 is secured to a front side of rail 1203, standard feeder 1204 is secured to a rear side of rail 1203. Yarn 1206 passes through combination feeder 1220, and an end of yarn 1206 extends outward from dispensing tip 1246. Although yarn 1206 is depicted, any other strand (e.g., filament, thread, rope, webbing, cable, chain, or yarn) may pass through combination feeder 1220. Another yarn 1211 passes through standard feeder 1204 and forms a portion of a knitted component 1260, and loops of yarn 1211 forming an uppermost course in knitted component 1260 are held by hooks located on ends of needles 1202.

The knitting process discussed herein relates to the formation of knitted component 1260 or portion of knitted component 1260. Thus, the portion of the knitted component 1260 can correspond to the strobel portion 124, the heel portion 128, the lateral portion 130, the medial portion 132, the forefoot portion 134, and/or the tongue portion 136 discussed above in relation to FIGS. 1-6. For purposes of the discussion, only a relatively small section of knitted component 1260 is shown in the figures in order to permit the knit structure to be illustrated. Moreover, the scale or proportions of the various elements of knitting machine 1200 and knitted component 1260 may be enhanced to better illustrate the knitting process.

Figure 16:
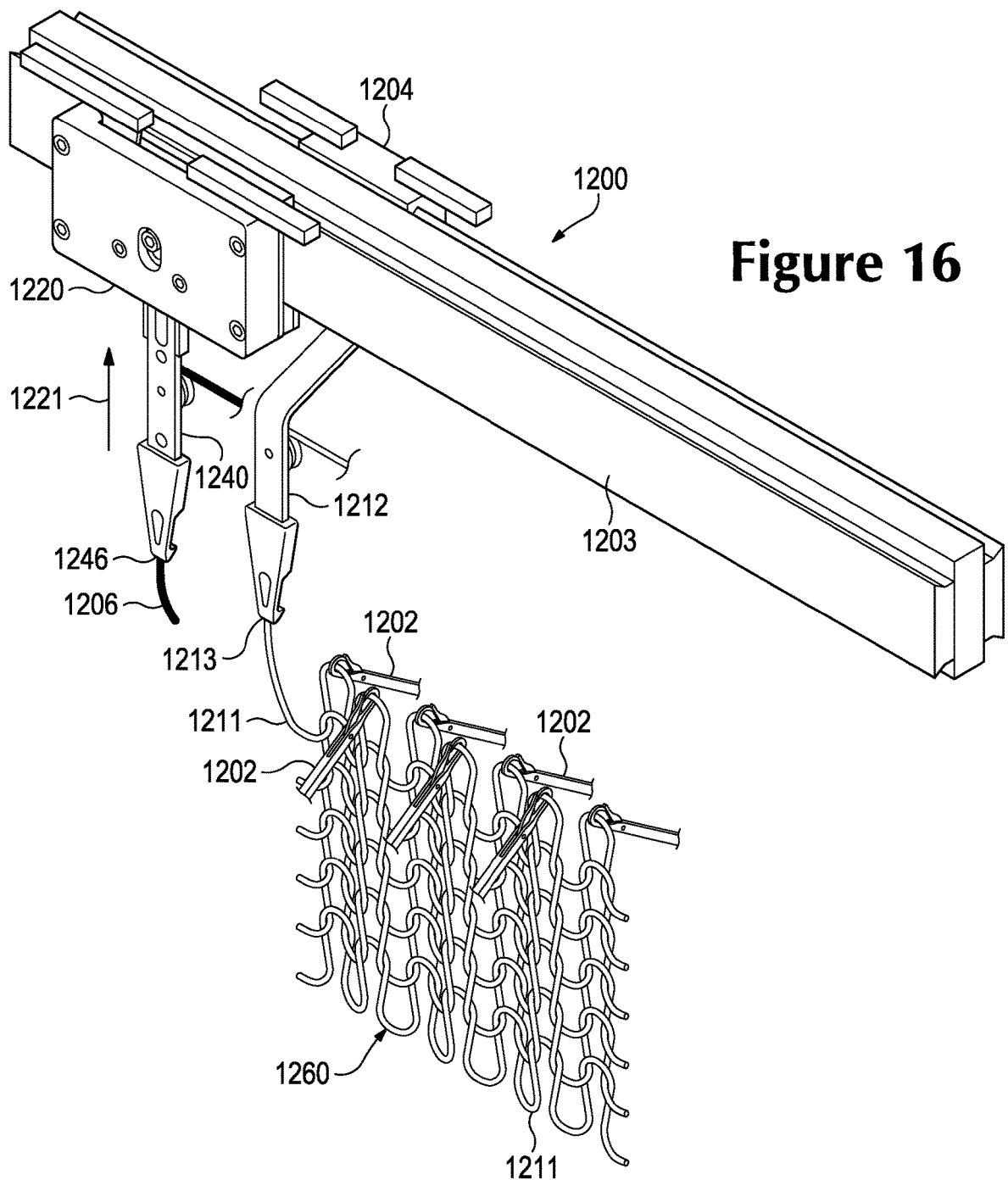

Referring now to FIG. 16, standard feeder 1204 moves along rail 1203 and a new course is formed in knitted component 1260 from yarn 1211. More particularly, needles 1202 pulled sections of yarn 1211 through the loops of the prior course, thereby forming the new course. Accordingly, courses may be added to knitted component 1260 by moving standard feeder 1204 along needles 1202, thereby permitting needles 1202 to manipulate yarn 1211 and form additional loops from yarn 1211.

Figure 17:
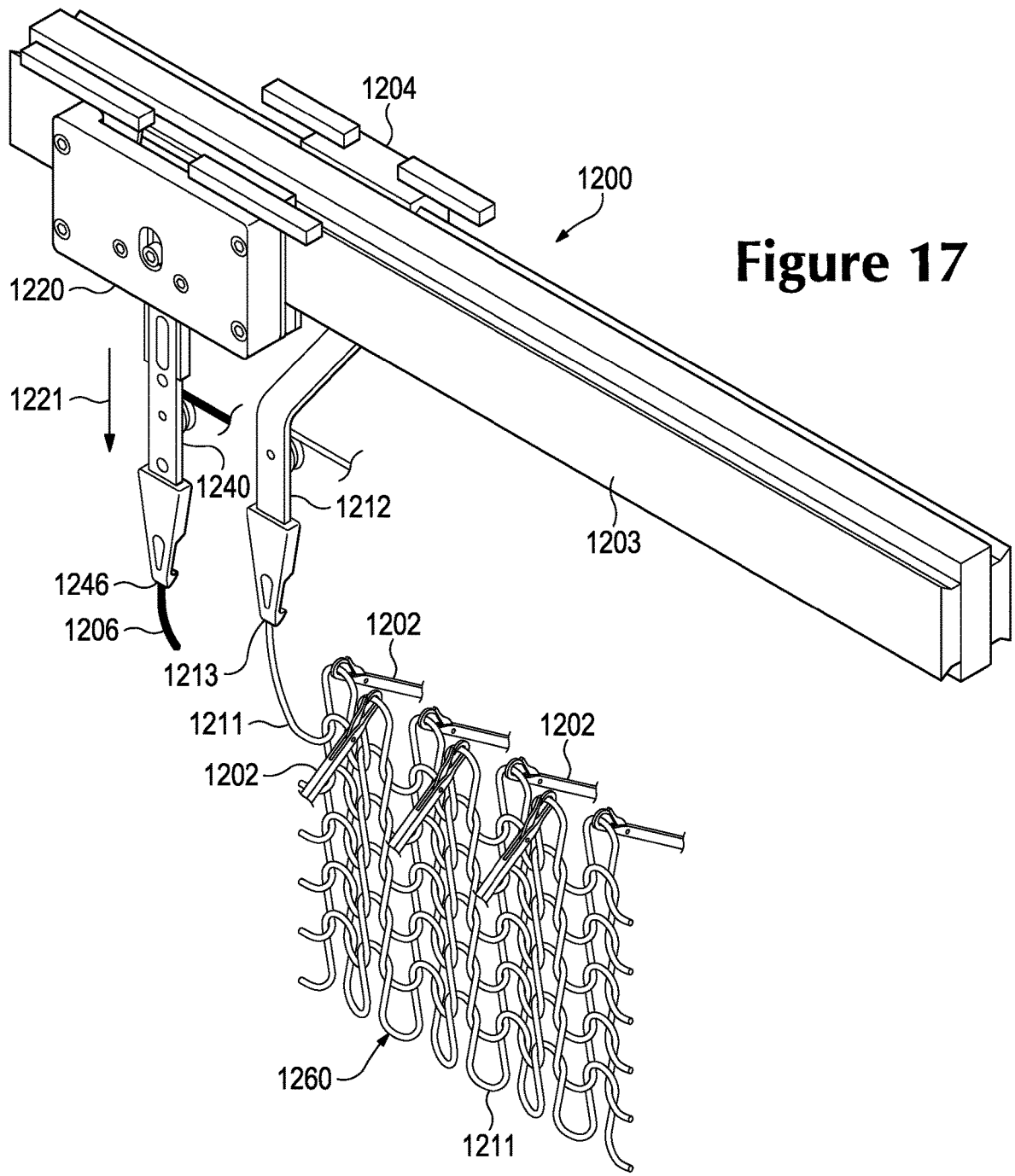

Continuing with the knitting process, feeder arm 1240 now translates from the retracted position to the extended position, as depicted in FIG. 17. In the extended position, feeder arm 1240 extends downward from carrier 1230 to position dispensing tip 1246 in a location that is (a) centered between needles 1202 and (b) below the intersection of needle beds.

Figure 18:
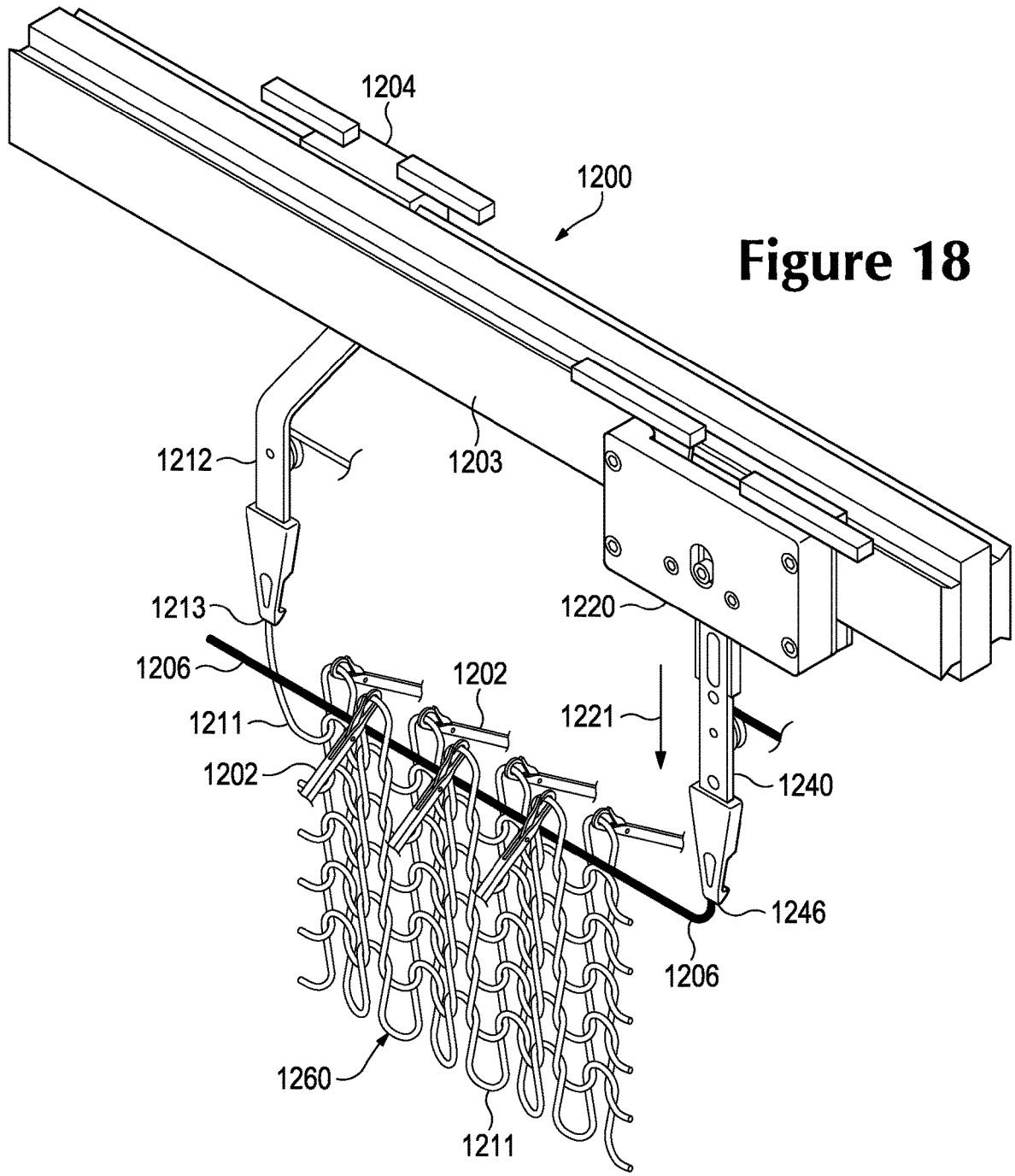

Referring now to FIG. 18, combination feeder 1220 moves along rail 1203 and yarn 1206 is placed between loops of knitted component 1260. That is, yarn 1206 is located in front of some loops and behind other loops in an alternating pattern. Moreover, yarn 1206 is placed in front of loops being held by needles 1202 from one needle bed 1201, and yarn 1206 is placed behind loops being held by needles 1202 from the other needle bed. Note that feeder arm 1240 remains in the extended position in order to inlay yarn 1206 in the area below the intersection of needle beds. This effectively places yarn 1206 within the course recently formed by standard feeder 1204 in FIG. 16.

Figure 19:
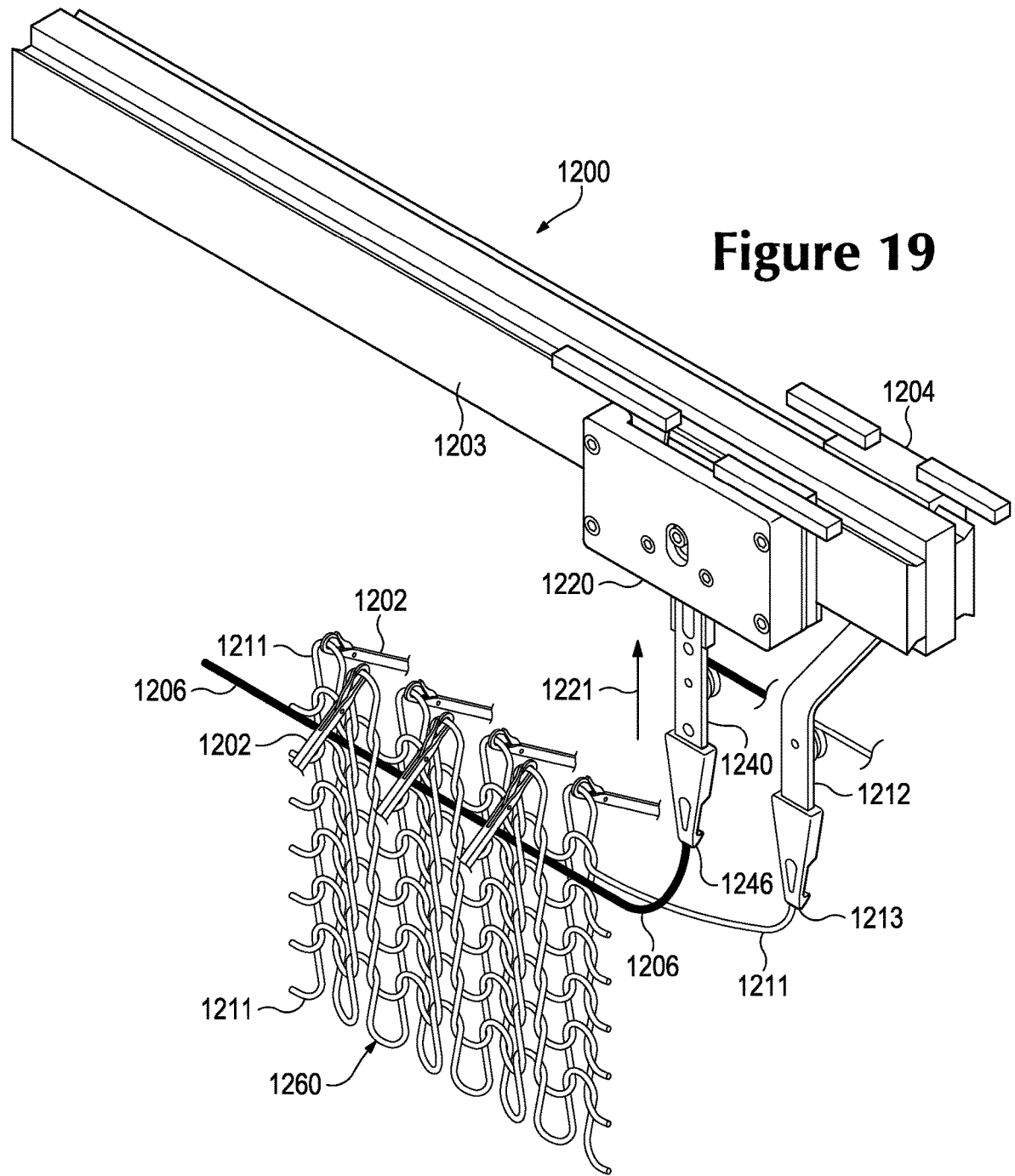

In order to complete inlaying yarn 1206 into knitted component 1260, standard feeder 1204 moves along rail 1203 to form a new course from yarn 1211, as depicted in FIG. 19. By forming the new course, yarn 1206 is effectively knit within or otherwise integrated into the structure of knitted component 1260. At this stage, feeder arm 1240 may also translate from the extended position to the retracted position.

FIGS. 18 and 19 show separate movements of feeders 1204 and 1220 along rail 1203. That is, FIG. 18 shows a first movement of combination feeder 1220 along rail 1203, and FIG. 19 shows a second and subsequent movement of standard feeder 1204 along rail 1203. In many knitting processes, feeders 1204 and 1220 may effectively move simultaneously to inlay yarn 1206 and form a new course from yarn 1211. Combination feeder 1220, however, moves ahead or in front of standard feeder 1204 in order to position yarn 1206 prior to the formation of the new course from yarn 1211.

The general knitting process outlined in the above discussion provides an example of the manner in which strand 158 of FIGS. 1-6 may be located in the strobel portion 124, the lateral portion 130, and/or the medial portion 132 of the upper 120. More particularly, because of the reciprocating action of feeder arm 1240, the strand 158 may be located within a previously formed course prior to the formation of a new course.

Figure 20:
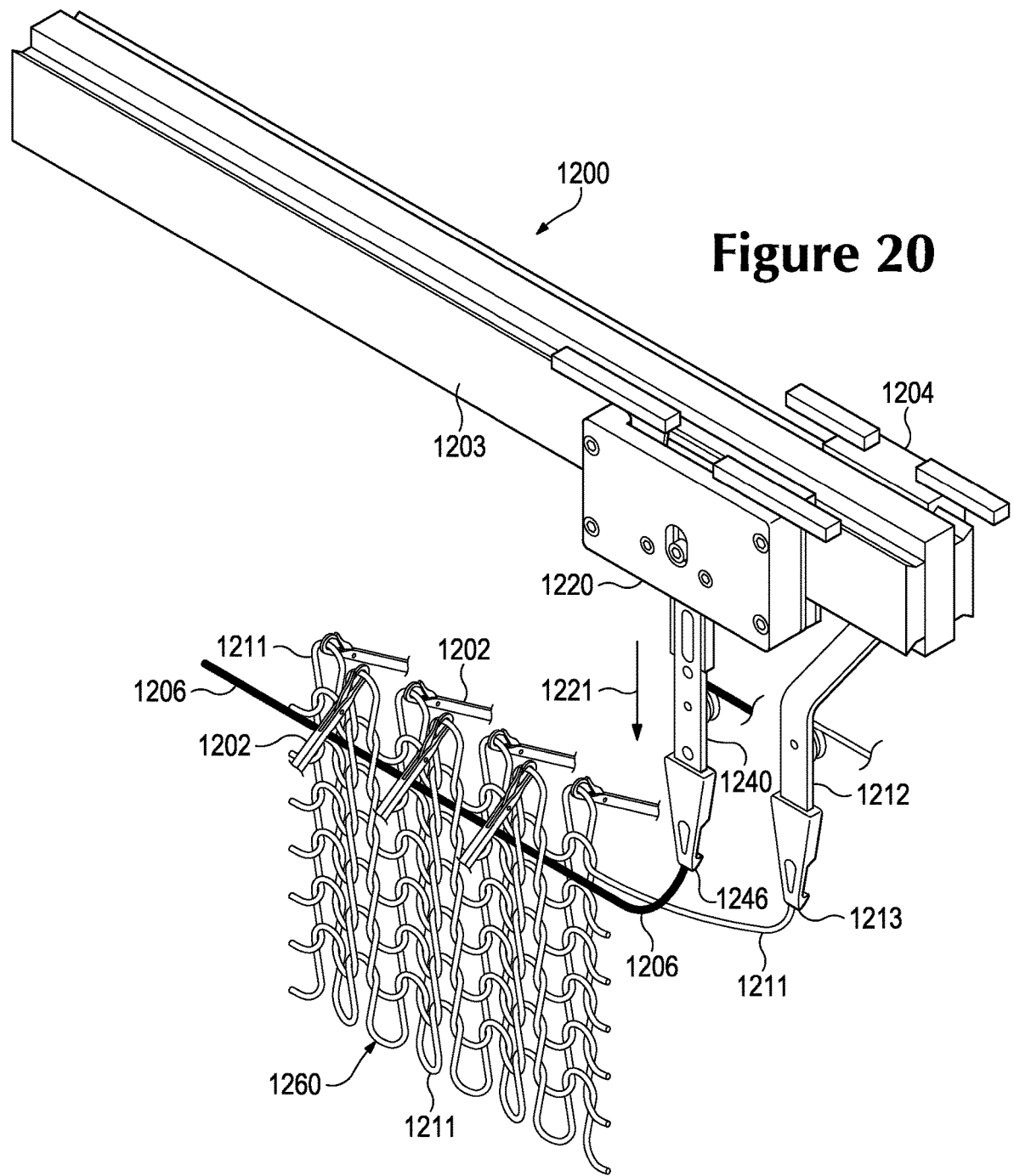
Figure 21:
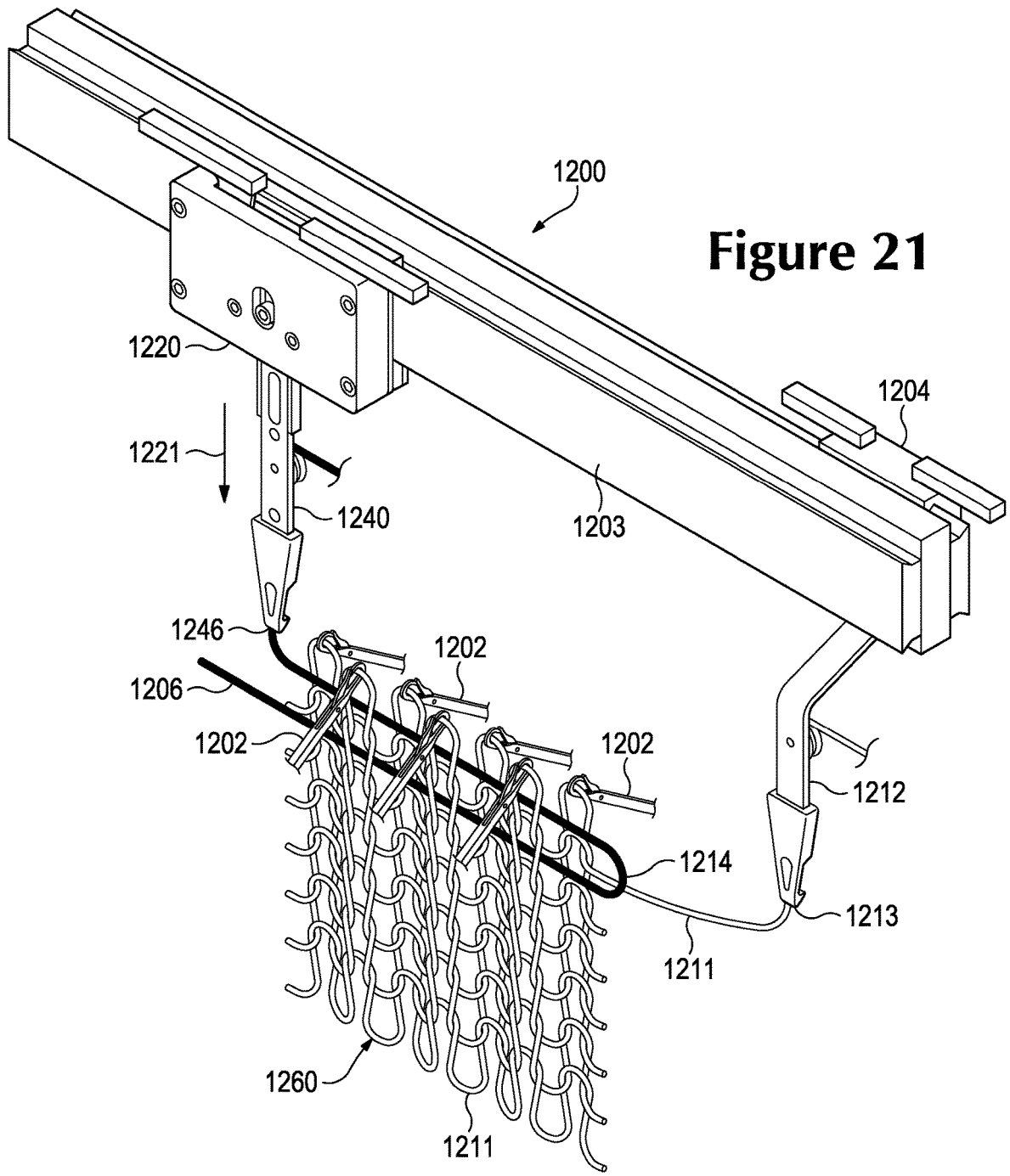
Figure 22:
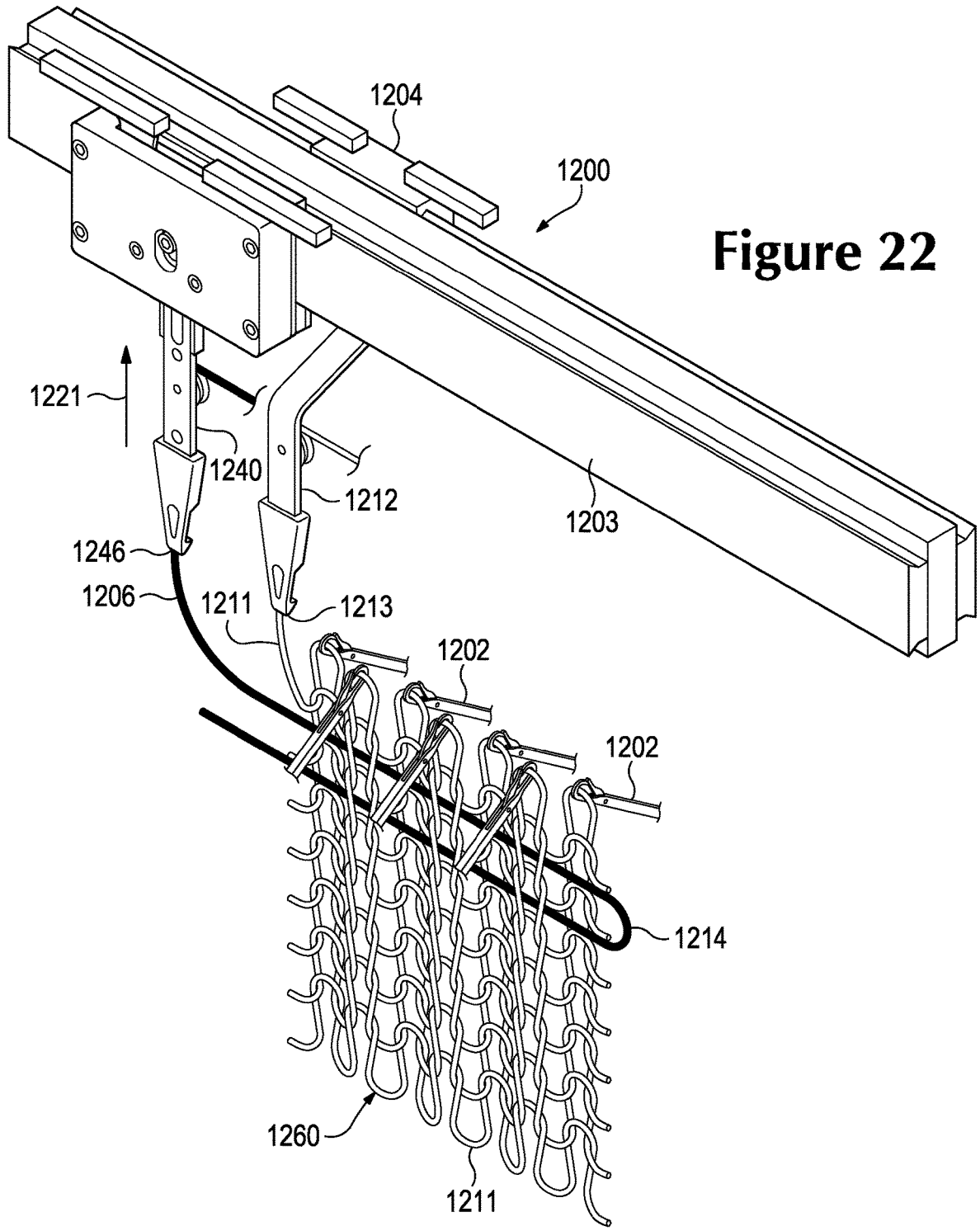

Continuing with the knitting process, feeder arm 1240 now translates from the retracted position to the extended position, as depicted in FIG. 20. Combination feeder 1220 then moves along rail 1203 and yarn 1206 is placed between loops of knitted component 1260, as depicted in FIG. 21. This effectively places yarn 1206 within the course formed by standard feeder 1204 in FIG. 19. In order to complete inlaying yarn 1206 into knitted component 1260, standard feeder 1204 moves along rail 1203 to form a new course from yarn 1211, as depicted in FIG. 22. By forming the new course, yarn 1206 is effectively knit within or otherwise integrated into the structure of knitted component 1260. At this stage, feeder arm 1240 may also translate from the extended position to the retracted position.

Referring to FIG. 22, yarn 1206 forms a loop 1214 between the two inlaid sections. In the discussion of the turns 159, 160 of FIGS. 1-6, it was noted that strand 158 exits the passage 162 and then enters another passage 162, thereby forming the turns 159, 160. Loop 1214 is formed in a similar manner. That is, loop 1214 is formed where yarn 1206 exits the knit structure of knitted component 1260 and then re-enters the knit structure.

Figure 23:
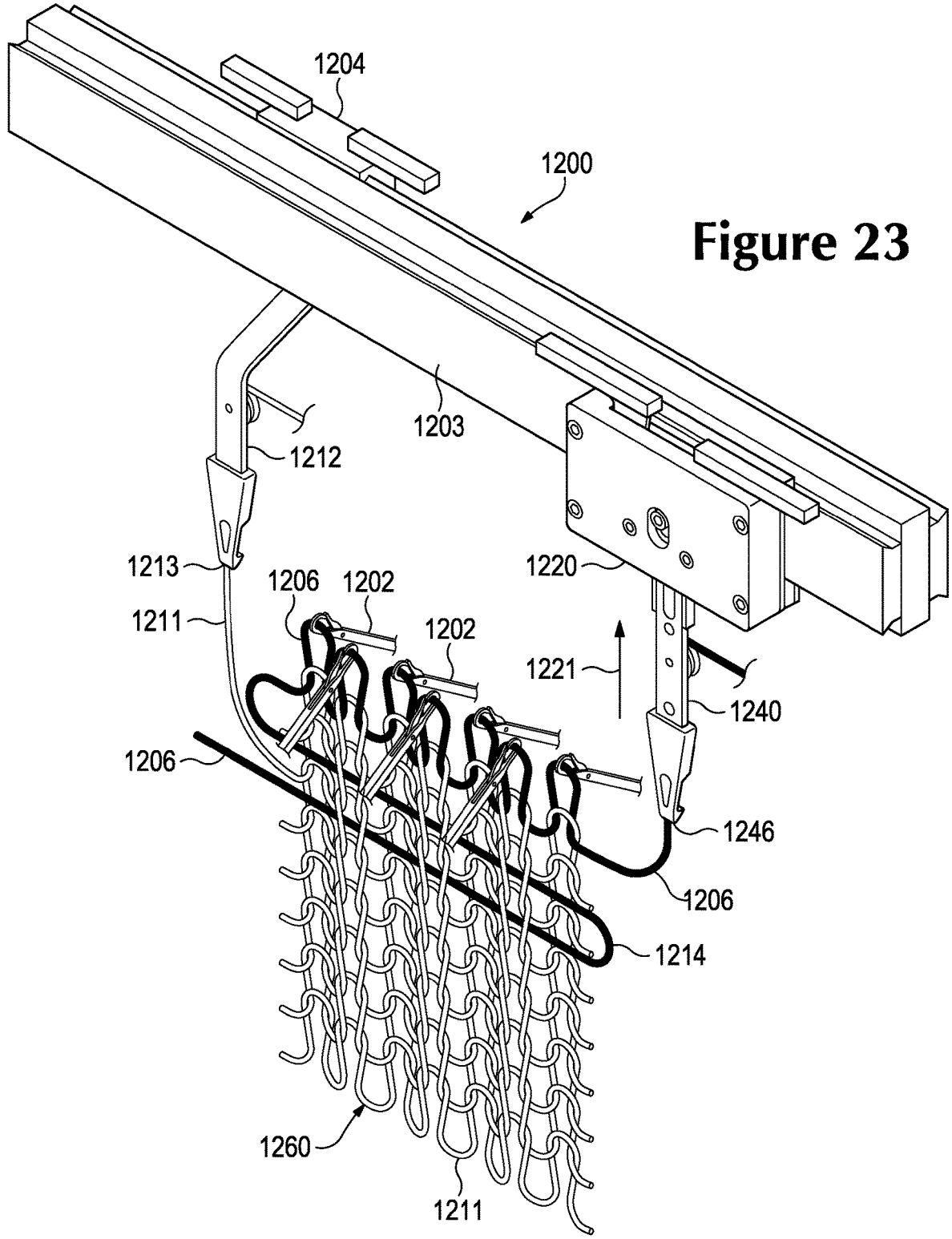

Referring to FIG. 23, combination feeder 1220 moves along rail 1203 while in the retracted position and forms a course of knitted component 1260 while in the retracted position. Accordingly, by reciprocating feeder arm 1240 between the retracted position and the extended position, combination feeder 1220 may supply yarn 1206 for purposes of knitting, tucking, floating, and inlaying.

The following discussion and accompanying figures disclose a variety of concepts relating to knitted components and the manufacture of knitted components. Although the knitted components may be utilized in a variety of products, an article of footwear that incorporates one of the knitted components is disclosed below as an example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An article of footwear comprising a sole structure and an upper, the upper comprising:
   a knitted component having unitary knit construction and having a base portion that is configured to be disposed underfoot and coextensive with the sole structure, the base portion comprising a first knit layer and a second knit layer overlapping with the first knit layer, wherein the first knit layer and the second knit layer each extend continuously between a lateral side and a medial side of the upper to define an underfoot portion passage that is coextensive with the base portion, the underfoot portion passage extending continuously between the lateral side and the medial side of the upper; and
   a tensile strand extending through the underfoot portion passage between the lateral and medial sides.

2. The article of footwear of claim 1, wherein the knitted component also includes a side portion that extends from the base portion, the side portion also defining at least one of an interior surface and an exterior surface, at least one of the interior surface and the exterior surface having three dimensional contour so as to define a cavity in the knitted component.

3. The article of footwear of claim 2, wherein the interior surface and the exterior surface comprise at least partially overlapping layers.

4. The article of footwear of claim 3, wherein spacer strands connect the at least partially overlapping layers.

5. The article of footwear of claim 4, wherein at least one of the interior surface and the exterior surface comprise knit monofilament material with the spacer strands connecting the at least partially overlapping layers.

6. The article of footwear of claim 5, wherein at least one of a side passage and a base portion passage is defined between at least partially overlapping layers of knit monofilament material.

7. The article of footwear of claim 4, wherein the spacer strands comprise at least one of a monofilament strand and a multifilament strand.

8. The article of footwear of claim 6, wherein the knitted component comprises a plurality of openings that expose different longitudinal areas of at least one of the side passage and the base portion passage.

9. The article of footwear of claim 1, wherein the tensile strand comprises a bonded nylon.

10. The article of footwear of claim 1, wherein the tensile strand includes an outer sheath.

* * * * *